United States Patent [19]
Ohyama et al.

[11] Patent Number: 5,864,364
[45] Date of Patent: Jan. 26, 1999

[54] COLOR IMAGE RECORDING AND REPRODUCING SYSTEM

[75] Inventors: Nagaaki Ohyama, Kawasaki; Toshiaki Wada, Tama; Masahiro Yamaguchi; Takashi Obi, both of Yokohama, all of Japan

[73] Assignee: Olympus Optical Co., Ltd., Tokyo, Japan

[21] Appl. No.: 763,230

[22] Filed: Dec. 10, 1996

[30] Foreign Application Priority Data

Dec. 19, 1995 [JP] Japan .................................. 7-330564

[51] Int. Cl.⁶ .................................. H04N 5/232
[52] U.S. Cl. ........................... 348/211; 348/227; 348/15; 348/370
[58] Field of Search ..................... 348/225, 227, 348/135, 207, 211, 212, 213, 222, 266, 272, 273, 370, 231, 232, 233, 15, 14, 29, 30; 386/1, 38, 45

[56] References Cited

U.S. PATENT DOCUMENTS

| 4,855,814 | 8/1989 | Shiraishi et al. ........................ 358/29 |
| 5,099,313 | 3/1992 | Suemoto et al. ........................ 358/29 |
| 5,617,139 | 4/1997 | Okino ..................................... 348/223 |

FOREIGN PATENT DOCUMENTS

| 0 531 891 A2 | 3/1993 | European Pat. Off. ......... H04N 1/46 |
| 5-216452 | 8/1993 | Japan . |
| 06051732 A | 2/1994 | Japan ............................... G09G 5/02 |

*Primary Examiner*—Wendy Garber
*Assistant Examiner*—Jacqueline Wilson
*Attorney, Agent, or Firm*—Frishauf, Holtz, Goodman, Langer & Chick

[57] ABSTRACT

A spectral image photographing section photographs the image of an object to be photographed as spectrum information in units of pixels so as to mutually record and reproduce a faithful image between two points. A photographing light spectrum detecting section detects the spectrum distribution of illumination light at a photographing point. A reproduction environment light spectrum detecting section detects the spectrum distribution of illumination light at a reproduction point. A spectral reflectance distribution calculating section eliminates the influence of the spectrum distribution of illumination light from the spectrum information photographed by the spectral image photographing section, and calculates the spectral reflectance distribution of the object. A spectrum converting section calculates, on the basis of the reproduction environment light spectrum detected by the reproduction environment light spectrum detecting section and the spectral reflection distribution calculated by the spectral reflectance distribution calculating section, a spectrum distribution obtained when the image of the object is photographed under illumination light substantially identical to that at the reproduction point. A vector imaging section converts the spectrum distribution of each pixel converted by the spectrum converting section into three-dimensional color.

20 Claims, 13 Drawing Sheets

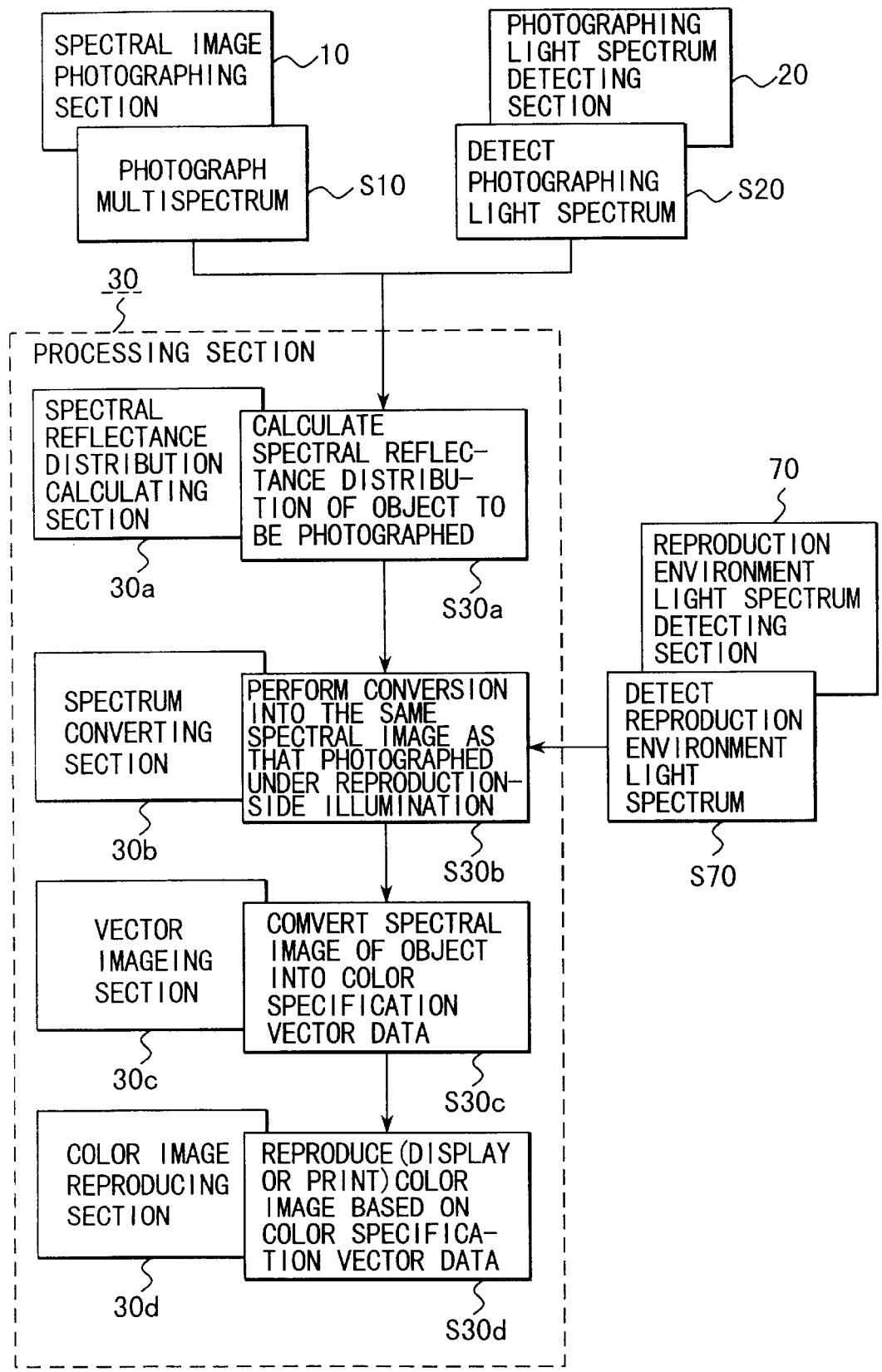
F I G. 1

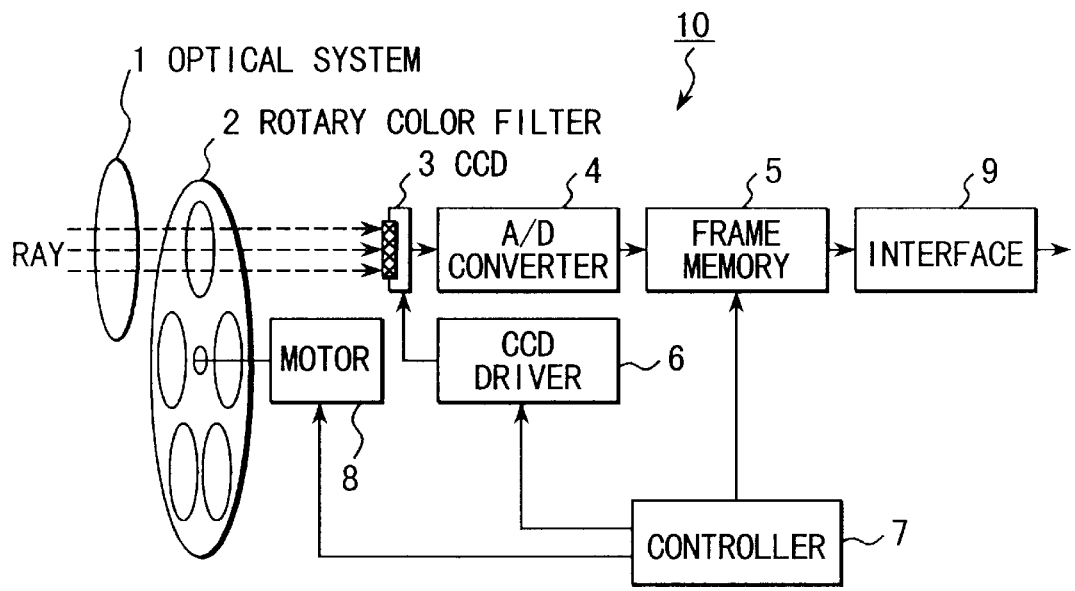
F I G. 4
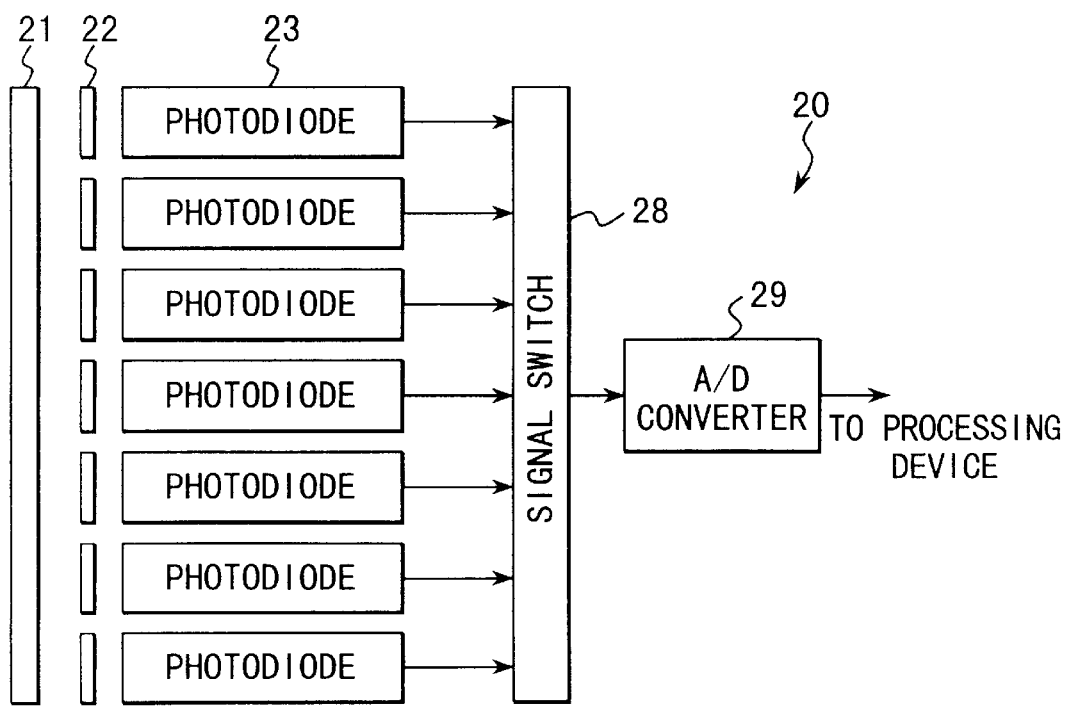
F I G. 5

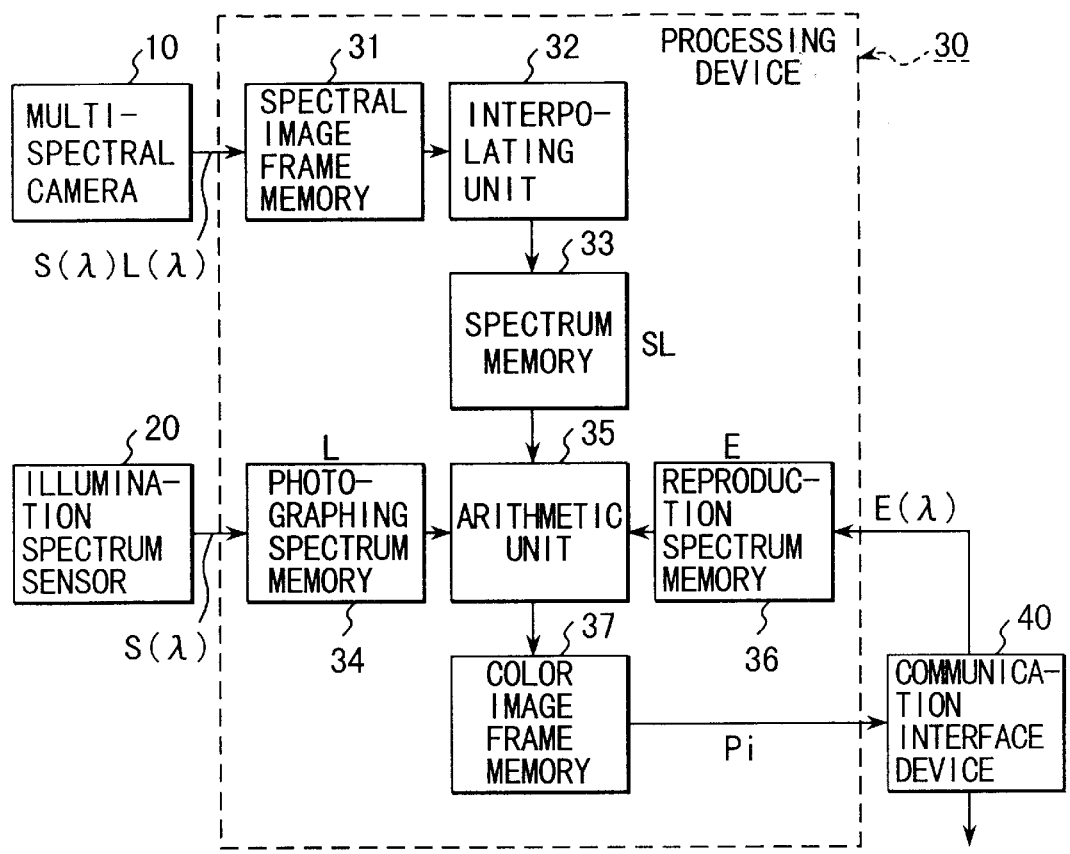
F I G. 6A
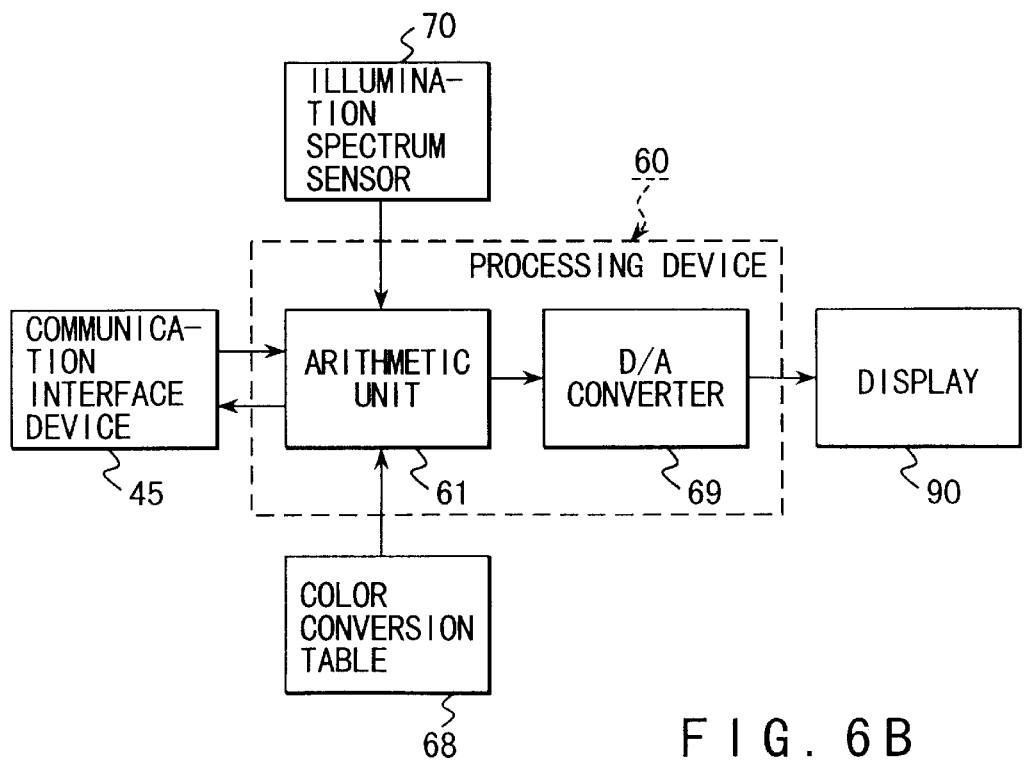
F I G. 6B

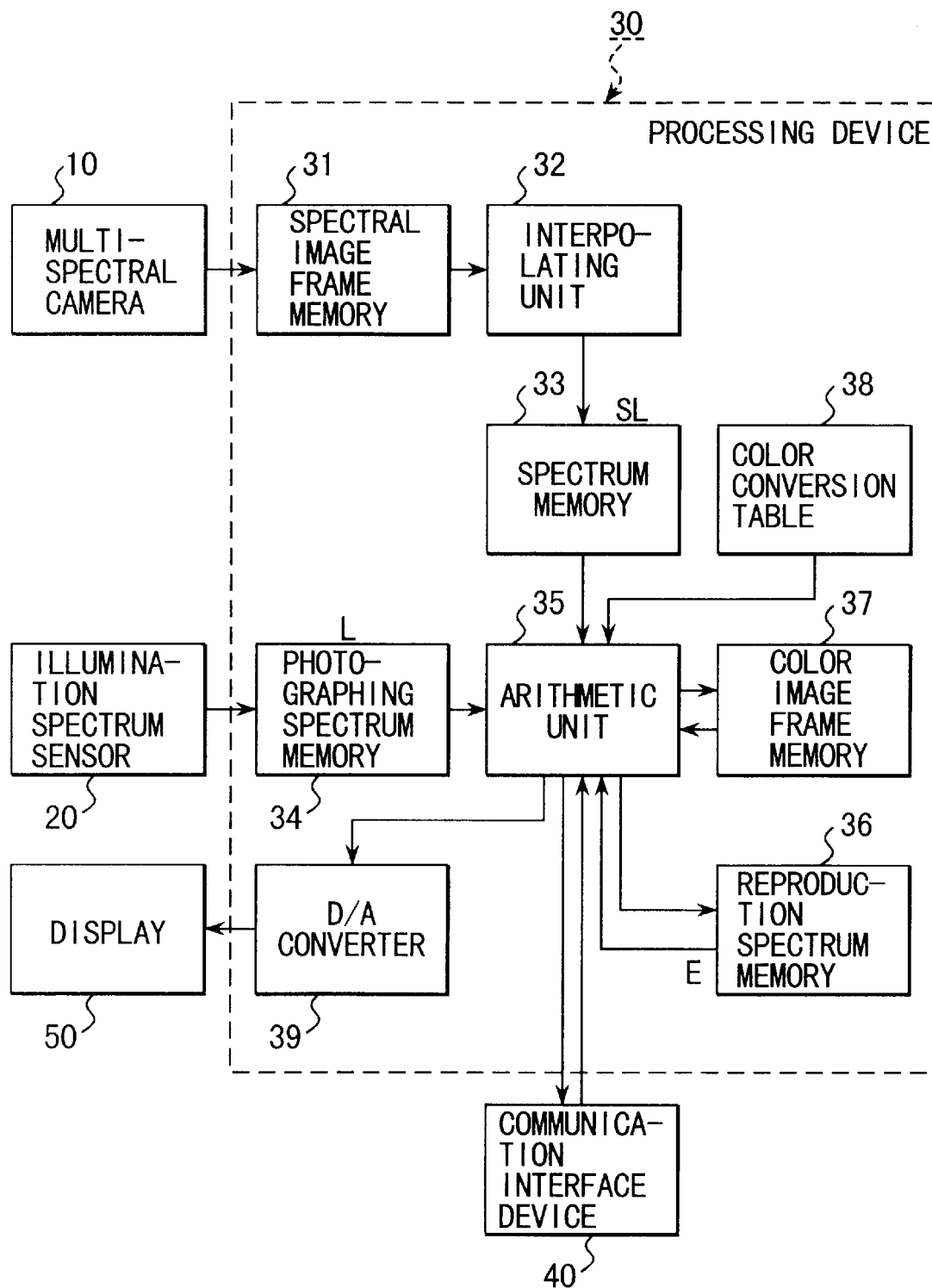
F I G. 10

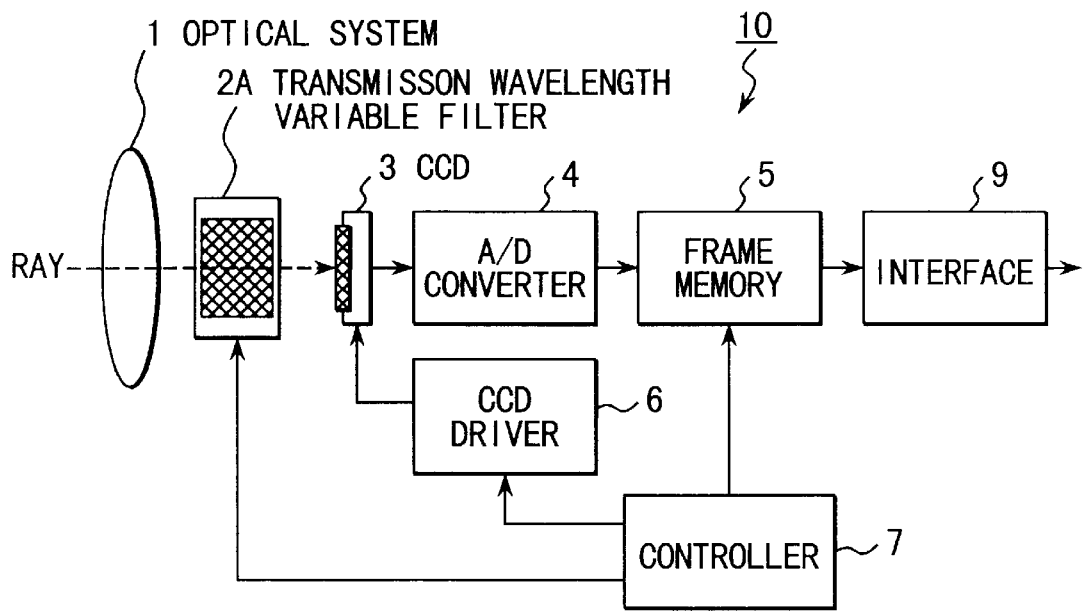
F I G. 1 4
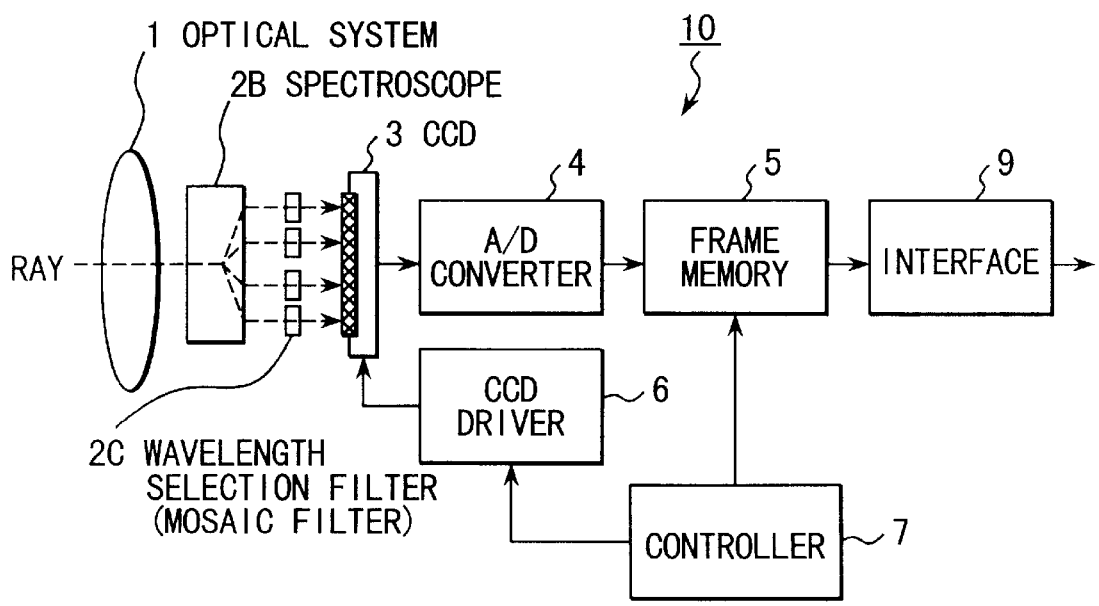
F I G. 1 5

COLOR IMAGE RECORDING AND REPRODUCING SYSTEM

BACKGROUND OF THE INVENTION

1. Field of the Invention

The present invention relates to a color image recording and reproducing system and, more particularly, to a color image recording and reproducing system using a color matching technique for matching display colors displayed under different ambient illumination conditions in a color matching technique of matching the color of a target object and its display color.

2. Description of the Related Art

Conventionally, accurate color reproduction is not taken into consideration in a television (TV) system for transmitting and reproducing a photographed color image. Only a visual image quality in reproduction is considered.

To reproduce an image photographed at a remote place with accurate colors, it is not sufficient to process the image by the camera to the display system without any distortion and error. The image must be reproduced in the environment wherein the image is illuminated by a light source having the same spectrum as that on the photographing side.

However, it is actually very difficult to prepare an illumination having the same spectrum on the photographing and reproduction sides.

In a technique of matching "three-dimensional" colors under almost the same conditions as those of three stimulus values represented by R, G, and B in order to perform color matching, which is known as a prior art, it is difficult that the color matching results accurately coincide with each other.

The reason is that there are color matching conditions.

More specifically, even if the spectrum is the same, a so-called XYZ colorimetric system, i.e., three color matching functions (color matching functions of an XYZ colorimetric system), like the ones shown in FIG. 8, are actually present as a human visual function. Actually, the spectrum is multiplied by this function to calculate an integrated value.

For this reason, even when a color is visually observed as a given color under a certain illumination, if the spectrum distribution changes, this color is observed as another color under another illumination.

Various attempts have been made to obtain the colors of printed matter or colors displayed on a TV monitor to be closer to colors visually recognized by man.

On the other hand, as the DTP system (Desk-ToP publishing; electronic publishing) has been spread with recent higher-performance and smaller-size computers, color matching techniques (e.g., Jpn. Pat. Appln. KOKAI Publication Nos. 5-216452 and 6-51732) of matching the colors of printed matter as an input/output target with display colors displayed on a TV monitor have been proposed.

These prior arts disclose a color matching technique of matching the colors of printed matter as an input/output target with display colors displayed on a TV monitor under various different ambient illumination conditions.

In either prior art, the display and printing places are assumed to be at the same point, i.e., under the same illumination conditions. These prior arts do not particularly disclose or indicate a technique of, e.g., reproducing by display or printing an image photographed at, e.g., a different remote place apart from a reproduction place with accurate color reproduction, i.e., matching the color of a reproduced object, i.e., the color of a display screen or printed matter with the color of the photographed object under different illumination conditions.

Originally, if a color image recording and reproducing system having the same transmission characteristics as the above-described three human visual properties is constructed, the color of a reproduced image is seen to be the same as the color of an object. However, since the visual properties vary due to individual differences, the color of the reproduced image and the color of the object are not always matched with each other for all people.

To completely match the color of the reproduced image with the color of the object in consideration of these situations (so as to allow an observer to perceive these colors as the same color), necessity for matching the spectra is required.

SUMMARY OF THE INVENTION

Taking this necessity into consideration, the first object of the present invention is to provide a color image recording and reproducing system which reproduces (displays or prints) an image photographed at, e.g., a remote place different from a reproduction place with accurate color reproduction by using a color reproducing technique of also matching the spectra.

In addition to the first object, the second object of the present invention is to provide a color image recording and reproducing system capable of accurately reproducing a color without increasing the information amount transmitted between the photographing and reproduction places.

According to the present invention, there is provided a color image recording and reproducing system for reproducing, at a different remote place, an image recorded at an arbitrary place, characterized by comprising spectral image photographing means for photographing an object to be photographed as spectrum data in units of pixels, photographing light spectrum detecting means for detecting a spectrum distribution (to be referred to as photographing light spectrum data hereinafter) of illumination light at a point where the object is photographed by the spectral image photographing means, reproduction environment light spectrum detecting means for detecting a spectrum distribution (to be referred to as reproduction environment light spectrum data hereinafter) of illumination light of a point (to be referred to as a reproduction point side hereinafter) where an image of the object photographed by the spectral image photographing means is reproduced, image converting means for converting, on the basis of the photographing light spectrum data detected by the photographing light spectrum detecting means and the reproduction environment light spectrum data detected by the reproduction environment light spectrum detecting means, the spectrum data photographed by the spectral image photographing means into color image data equivalent to color image data obtained when the object is photographed under illumination light substantially identical to that on the reproduction point side, and color image reproducing means for reproducing the color image data converted by the image converting means.

According to the present invention, there is provided a color image recording and reproducing system for reproducing, at a different remote place, an image recorded at an arbitrary place, characterized by comprising spectral image photographing means for photographing an object to be photographed as spectrum data in units of pixels, photographing light spectrum detecting means for detecting a spectrum distribution (to be referred to as photographing light spectrum data hereinafter) of illumination light at a point where the object is photographed by the spectral image photographing means, spectral reflectance distribution calculating means for eliminating an influence of the photographing light spectrum data detected by the photographing light spectrum detecting means from the spectrum data photographed by the spectral image photographing means, and calculating a spectral reflectance distribution of the object, reproduction environment light spectrum detecting means for detecting a spectrum distribution (to be referred to as reproduction environment light spectrum data hereinafter) of illumination light of a point (to be referred to as a reproduction point side hereinafter) where an image of the object photographed by the spectral image photographing means is reproduced, spectrum converting means for calculating, on the basis of the spectral reflectance distribution calculated by the spectral reflectance distribution calculating means and the reproduction environment light spectrum data detected by the reproduction environment light spectrum detecting means, a spectrum distribution obtained when the object is photographed under illumination light substantially identical to that on the reproduction point side, vector imaging means for converting a spectrum distribution corresponding to each of the pixels calculated by the spectrum converting means into three-dimensional color specification vector data, and color image reproducing means for reproducing a color image of the object on the basis of the color specification vector data converted by the vector imaging means.

According to the present invention, there is provided a color image recording and reproducing system characterized by further comprising transmitting means for mutually transmitting data on a point side where the image of the object is photographed, and data on a point side where the image of the object is reproduced.

According to the present invention, there are provided color image recording and reproducing systems for mutually recording and reproducing images between first and second different points, characterized in that each color image recording and reproducing system is constituted by spectral image photographing means for photographing an object to be photographed as spectrum data in units of pixels, photographing light spectrum detecting means for detecting a spectrum distribution (to be referred to as photographing light spectrum data hereinafter) of illumination light at a point where the object is photographed by the spectral image photographing means, spectral reflectance distribution calculating means for eliminating influence of the photographing light spectrum data detected by the photographing light spectrum detecting means from the spectrum data photographed by the spectral image photographing means, and calculating a spectral reflectance distribution of the object, reproduction environment light spectrum detecting means for detecting a spectrum distribution (to be referred to as reproduction environment light spectrum data hereinafter) of illumination light of a point (to be referred to as a reproduction point side hereinafter) where an image of the object photographed by the spectral image photographing means is reproduced, spectrum converting means for calculating, on the basis of the spectral reflectance distribution calculated by the spectral reflectance distribution calculating means and the reproduction environment light spectrum data detected by the reproduction environment light spectrum detecting means, a spectrum distribution obtained when the object is photographed under illumination light substantially identical to that on the reproduction point side, vector imaging means for converting a spectrum distribution corresponding to each of the pixels calculated by the spectrum converting means into three-dimensional color specification vector data, and color image reproducing means for reproducing a color image of the object on the basis of the color specification vector data converted by the vector imaging means, wherein the color image recording and reproducing systems are respectively arranged at the first and second points, and the color image recording and reproducing systems further comprise transmitting means for mutually transmitting the reproduction environment light spectrum data and the color specification vector data between the first point and the second point.

According to the present invention, there is provided a color image recording and reproducing method of mutually recording and reproducing images between first and second two different points, characterized by comprising the spectral image photographing step of photographing an object to be photographed as spectrum data at the first point in units of pixels, the photographing light spectrum detecting step of detecting a spectrum distribution (to be referred to as photographing light spectrum data hereinafter) of illumination light at a point where the object is photographed, the spectral reflectance distribution calculating step of eliminating an influence of the photographing light spectrum data from the spectrum data photographed in the spectral image photographing step, and calculating a spectral reflectance distribution of the object, the reproduction environment light spectrum detecting step of detecting a spectrum distribution (to be referred to as reproduction environment light spectrum data herein-after) of illumination light at the second point where an image of the object is reproduced, the reproduction environment light spectrum data transmitting step of transmitting the reproduction environment light spectrum data at the second point detected in the reproduction environment light spectrum detecting step to the first point, the spectrum data converting step of calculating, on the basis of the reproduction environment light spectrum data transmitted in the reproduction environment light spectrum data transmitting step, and data of the spectral reflectance distribution calculated in the spectral reflectance distribution calculating step, a spectrum distribution obtained when the object is photographed under illumination light substantially identical to that on the second point side, the vector imaging step of converting a spectrum distribution of each of the pixels calculated in the spectrum converting step into three-dimensional color specification vector data, and the color image reproducing step of reproducing a color image of the object on the basis of the color specification vector data converted in the vector imaging step.

According to the above-described color image recording and reproducing system, a photographed image is reproduced upon converting the spectrum data of the photographed image on the basis of the spectrum distribution (reproduction environment light spectrum data) of illumination light at the reproduction point. For this reason, even if the object image is photographed at, e.g., a remote place different from the reproduction place, the object image can be reproduced by display or printing under accurate color reproduction.

According to the above-described color image recording and reproducing system, the color is converted into proper data, such as R, G, and B, or Y, C, M, and K, in accordance with the characteristics of the reproducing device on the reproduction point side. Therefore, the colors of the image can be accurately reproduced regardless of the types of reproducing devices.

In addition, the above-described color image recording and reproducing system can be used as a color image recording and reproducing system capable of optimum two-way communication in accordance with a situation in which data on a point side where the object image is photographed, and data on a point side where the object image is reproduced are mutually transmitted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic view of a system showing the whole arrangement and processing flow of a color image recording and reproducing system according to the present invention;

FIG. 4 is a view of the arrangement of a multispectral camera 10 employing a rotary filter;

FIG. 5 is a block diagram showing the arrangement of an illumination spectrum detecting section 20;

FIG. 6A is a block diagram showing the detailed arrangement of a processing device 30 on the photographing side;

FIG. 6B is a block diagram showing the detailed arrangement of a processing device 60 on the reproduction side;

FIG. 10 is a block diagram showing the arrangement of a processing device 30 in the two-way color system of the second embodiment of the present invention;

FIG. 14 is a view showing a modification of the arrangement of the multispectral camera 10 in FIG. 4; and FIG. 15 is a view showing a modification of the arrangement of the multispectral camera 10 in FIG. 4.

DETAILED DESCRIPTION OF THE PREFERRED EMBODIMENTS

Figure 2:
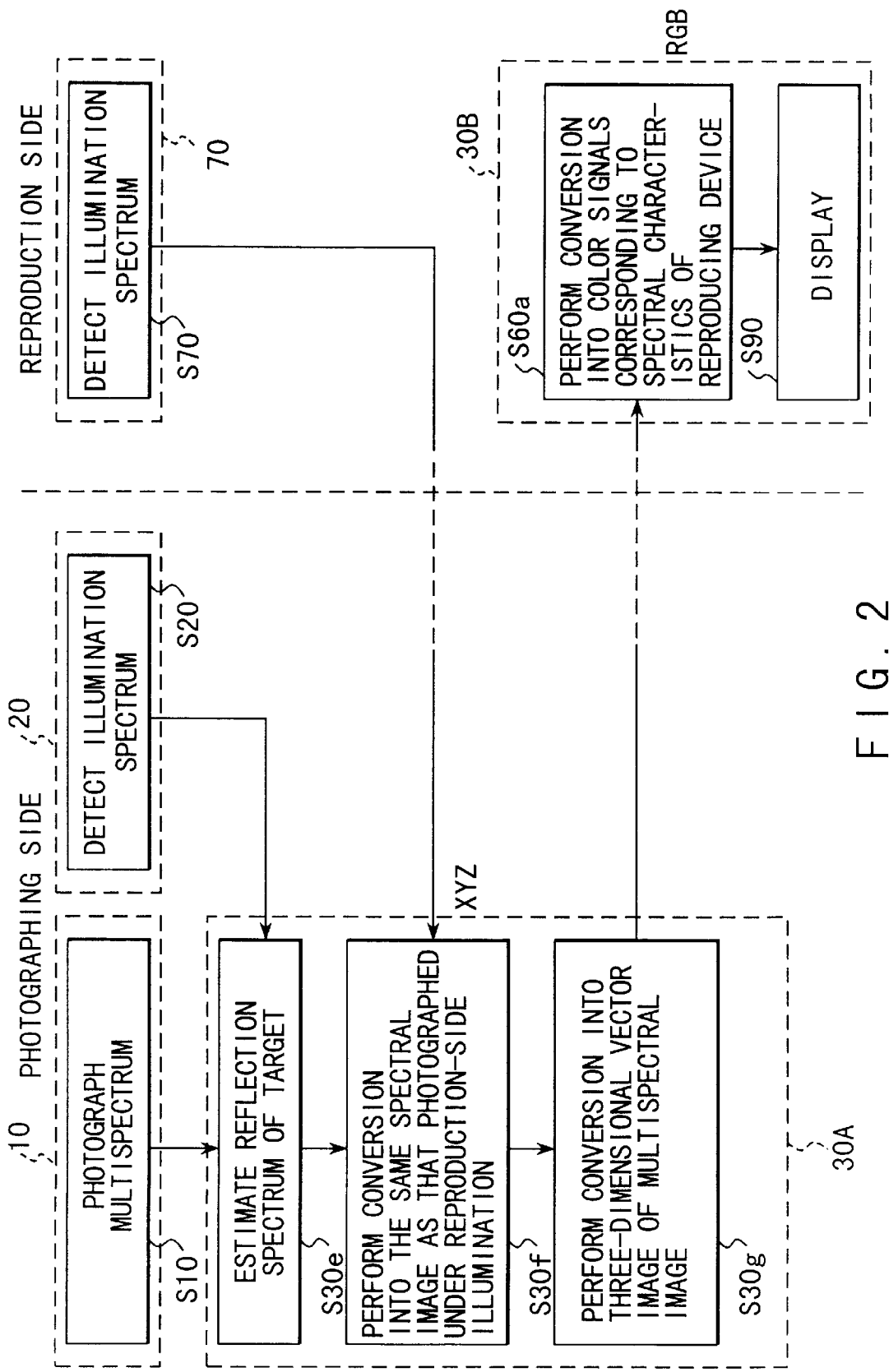
FIG. 2 is a block diagram of the system showing a processing flow between the "photographing side" and the "reproduction side" in the color image recording and reproducing system of the present invention.

Reference will now be made in detail to the presently preferred embodiments of the invention as illustrated in the accompanying drawings, in which like reference characters designate like or corresponding parts throughout the several drawings.

First of all, a color image recording and reproducing system according to the present invention will be generally described with reference to FIG. 1.

FIG. 1 schematically shows the whole arrangement and processing flow of the color image recording and reproducing system according to the present invention.

More specifically, the color image recording and reproducing system according to the present invention is a system for transferring color image information between at least two remote points apart from each other.

For example, the color image recording and reproducing system for mutually recording and reproducing color images between first and second different points apart from each other is constituted by respective constituent sections for executing processing steps represented by blocks shown in FIG. 1.

More specifically, the color image recording and reproducing system comprises a spectral image pickup section 10 for executing a spectral image pickup step (step S10) of photographing the image of an object to be photographed as spectrum data in units of pixels, and a photographing light spectrum detecting section 20 for executing a photographing light spectrum detecting step (step S20) of detecting the spectrum distribution (photographing light spectrum data) of illumination light at the point where the image of the object is photographed.

This system further comprises a processing section 30 for receiving two pieces of information from the spectral image photographing section 10 and the photographing light spectrum detecting section 20.

A reproduction environment light spectrum detecting section 70 for executing a reproduction environment light spectrum detecting step (step S70) of detecting the spectrum distribution of illumination light at the second point (to be described later) where the image of the object is reproduced is externally connected to the processing section 30.

The processing section 30 is constituted by respective constituent elements for executing the following processing steps.

More specifically, the processing section 30 is constituted by a spectral reflectance distribution calculating section 30a for executing a spectral reflectance distribution calculating step (step S30a) of eliminating influence of the spectrum distribution (photographing light spectrum data) of the illumination light from the spectrum data, and calculating the spectral reflectance distribution of the object, a transmitting means (not shown) for executing a reproduction environment light spectrum data transmitting step (not shown) of transmitting the reproduction environment light spectrum data of the second point detected in the reproduction environment light spectrum detecting step (step S70) to the first point, a spectrum converting section 30b for executing a spectrum converting step (step S30b) of calculating, on the basis of the reproduction environment light spectrum data detected in the reproduction environment light spectrum detecting step (step S70) and the data of the spectral reflectance distribution, a spectrum distribution obtained when the image of the object is photographed under illumination light equivalent to that at the reproduction point side, a vector imaging section 30c for executing a vector imaging step (step S30c) of converting the spectrum distribution of each pixel calculated in the spectrum converting step (step S30b) into three-dimensional color specification vector data, a transmitting means (not shown) for executing a color specification vector data transmitting step (not shown) of transmitting the color specification vector data to the second point, and a color image reproducing section 30d for executing a color image reproducing step (step S30d) of reproducing and outputting a color image by means of display, printing, or the like on the basis of the color specification vector data.

In the color image recording and reproducing system of the present invention which executes the above-described color image recording and reproducing, information transmitted between the two exemplified points consists of only the reproduction environment light spectrum data and the color specification vector data whose data amounts are small. Therefore, the information amount is also small not to increase the transmission capacity.

According to this system, it is possible to reproduce and output a photographed image upon color reproduction in an accurate state at a point such as a remote point different from the photographing point.

Detailed embodiments of the color image recording and reproducing system according to the present invention will be sequentially described below with reference to the accompanying drawings.

(First Embodiment)

FIG. 2 shows the whole arrangement and processing flow of this system as the first embodiment of the present invention.

The processing itself of this embodiment is the same as that in the above general description with reference to FIG. 1. However, in the system arrangement of this embodiment, devices 10, 20, and 30A on the "photographing side" where a target object is observed and photographed, and devices 70 and 30B on the "reproduction side" where the photographed image is reproduced are present apart from each other.

The devices on the photographing and reproduction sides are coupled via some line and the like so as to allow data transmission.

Referring to FIG. 2, these "photographing side" devices 10, 20, and 30A and these "reproduction side" devices 70 and 30B, which constitute this system, are assigned to respective processing steps and execute them as follows.

First, a desired object illuminated by a predetermined light source is photographed by a camera having a multispectral function (step S10).

That is, this photographing result is obtained by photographing the object in a state wherein the spectrum of the light source illuminating the object and the actual object spectrum are multiplied with each other.

The illumination spectrum in photographing is detected by the photographing light spectrum detecting section 20 and the like on the photographing side according to any method (step S20).

With the above-described processing, the image data obtained upon photography contains a spectrum obtained upon multiplying both the spectrum of the illumination light source used in photographing and the reflection spectrum of the object.

The processing section 30A estimates that a component calculated by dividing the spectrum component of the obtained image data by the illumination spectrum component is the reflection spectrum of the object (step S30e).

At the same time, also on the reproduction side, the reproduction environment light spectrum detecting section 70 detects the illumination spectrum of the reproduction-side environment for reproduction (step S70).

The illumination spectrum information detected on the reproduction side is sent to the photographing side via a transmission path.

At this point, correction of the illumination light source is completed on the photographing side, as described above. The reflection spectrum of the object itself free from the influence of the photographing illumination light source is generated.

The processing section 30A multiplies the reproduction-side illumination spectrum sent from the reproduction side with the reflection spectrum of the object (step S30f).

With this processing, the spectrum information obtained on the photographing side looks as if the object existed under the reproduction-side illumination.

Figure 8:
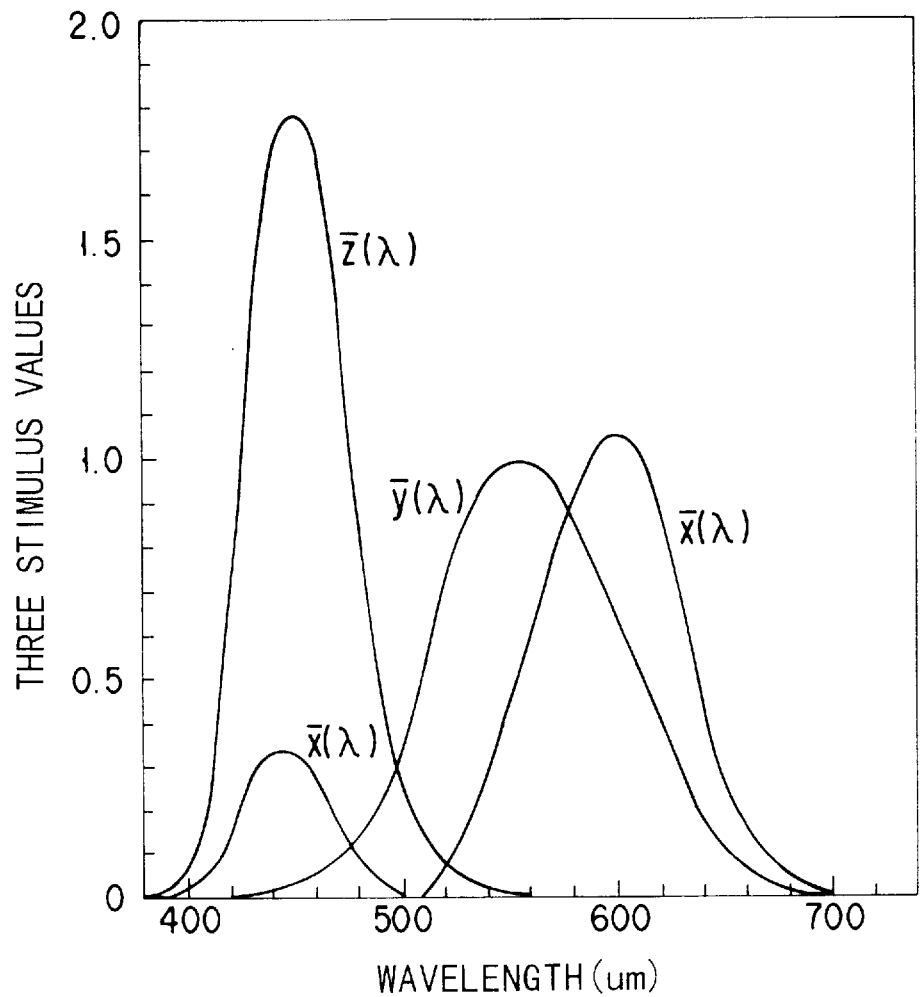
FIG. 8 is a graph showing the "color matching function" of an XYZ colorimetric system as a human visual function.

The processing section 30A multiplies the spectrum data obtained in this manner by the color matching function (e.g., a function exemplified in FIG. 8) of a properly selected colorimetric system and converts it into color specification vector data of three values (X, Y, and Z in FIG. 8; step S30g).

The color matching function of the colorimetric system frequently used in general includes the XYZ colorimetric system and the L*a*b colorimetric system.

The processing section 30A converts a multidimensional spectral image into a three-dimensional spectral image by multiplying the spectrum data by such a color matching function, and transmits the obtained image to the reproduction-side device via the line.

The processing section 30B on the reproduction side converts the three-dimensional color specification vector data transmitted from the photographing side into color signals corresponding to the spectral characteristics (device values) of the reproducing device (step S60a), and displays an image (step S90).

In this case, as the device values of the reproducing device, a light-emitting display device such as a cathode-ray tube display generally employs R, G, and B values, and a reflection device such as a printer generally employs C, M, Y, and K values.

That is, the processing section 30B obtains in advance the relationship between the output characteristics of the reproducing device and device values input to this reproducing device. By using this relationship, the processing section 30B converts color specification vector data into the device values such that the color specification vector data accurately reproduce colors represented by the data, and performs display on a monitor or the like.

Note that functions of accurately reproducing the colors represented by the color specification vector data have already been supported as a CMS (Color Management System) on the OS (Operation System) level of a personal computer in consideration of the output characteristics of the reproducing device. These functions may be utilized.

The processing about the operation of the first embodiment of this system has been explained above.

Figure 3:
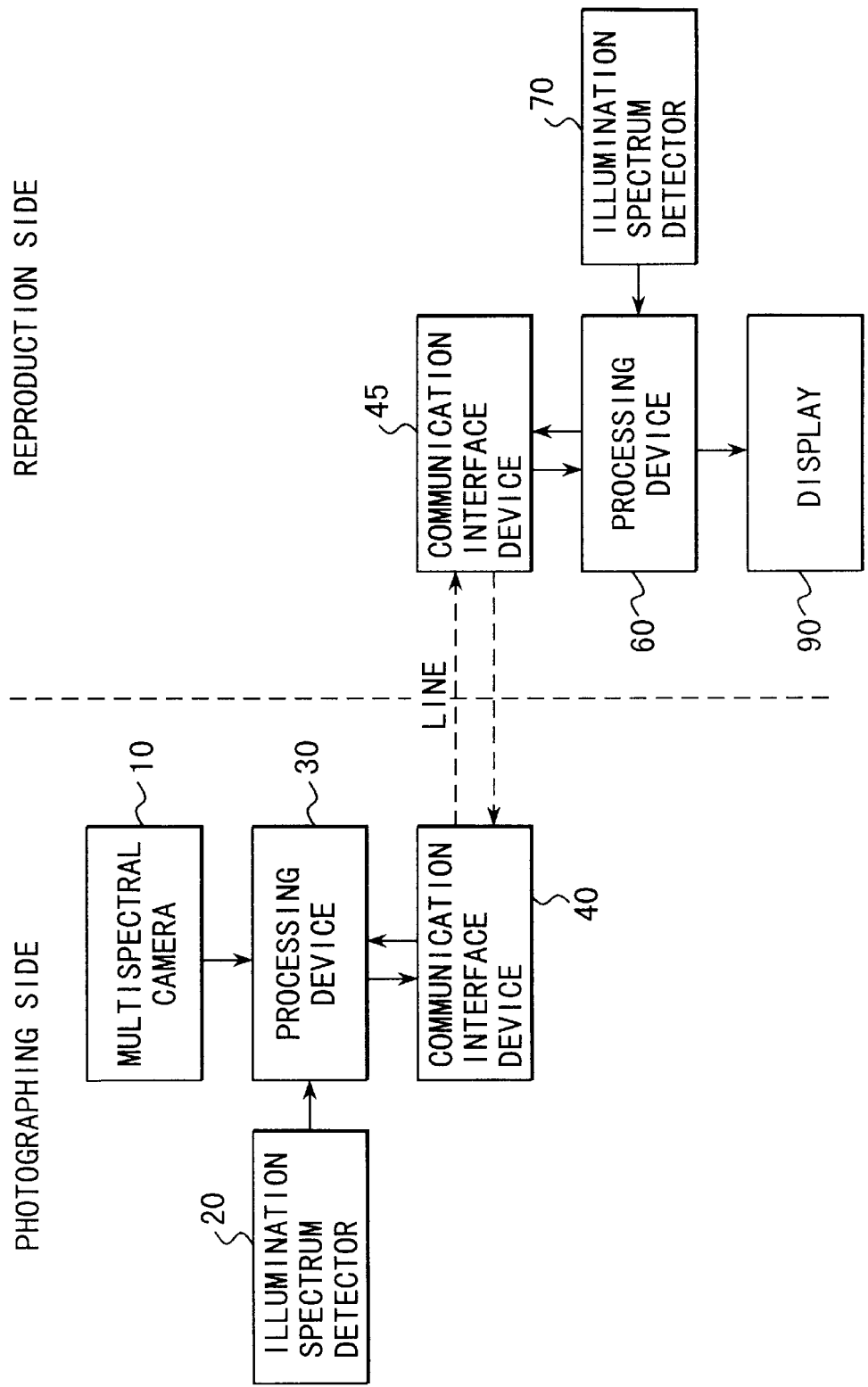
FIG. 3 is a block diagram of the system showing a system arrangement as the first embodiment according to the present invention.

FIG. 3 is a block diagram showing the system arrangement as the first embodiment of the present invention.

With the system arrangement shown in FIG. 3, the above-mentioned processing flow is realized. For example, in this embodiment, the "photographing side" and the "reproduction side" are physically or spatially coupled to each other via a communication line.

More specifically, as shown in FIG. 3, the object is photographed by the multispectral camera 10 on the photographing side.

In this system, the illumination spectrum detector 20 is connected to the processing device 30.

Similarly on the reproduction side, the illumination spectrum detector 70 is connected to a processing device 60.

On the photographing side, the illumination spectrum detector 20 is separately arranged, as shown in FIG. 3. However, if a white object as a reference object, e.g., a white diffusion plate is photographed once using the multispectral camera 10 without arranging any illumination spectrum detector 20, the photographing result can be used as an illumination spectrum.

The processing device 30 having such a means for detecting the illumination spectrum performs the following processing upon reception of two pieces of information from the above-mentioned multispectral camera 10 and illumination spectrum detector 20.

Image data processed by the processing device 30 is transmitted through the line via a communication interface device 40 and sent to the processing device 60 via a reproduction-side communication interface device 45 at a remote point.

On the reproduction side, the illumination light spectrum on the reproduction side is detected in advance by the above-described illumination spectrum detector 70. This illumination spectrum information is reversely transmitted through the line and sent to the photographing side.

On the basis of the entire image photographed in advance by the multispectral camera 10 and the illumination spectrum at that time, the processing device 30 on the photographing side performs correction processing with this illumination light to leave only the reflection spectrum component of the object.

Further, on the basis of illumination spectrum information sent from the reproduction side, the processing device 30 on the photographing side multiplies the reflection spectrum component by this value to convert it such that the illumination light becomes equivalent to the illumination light on the reproduction side. At the same time, the processing device 30 sends information obtained by multiplying the reflection spectrum component by three proper color matching functions as described above to the processing device 60 on the reproduction side via the communication interface devices 40 and 45.

The processing device 60 on the reproduction side properly converts the information sent from the processing device 30 on the photographing side so as to output and display accurate colors on a display device by the CMS function thereof like the one described above. Then, the processing device 60 displays an image on a display 90.

With this processing, colors faithful to the original colors of the object are reproduced on the reproduction side. The observer is allowed to observe the object at a remote point as if the object is present in front of the observer's eyes.

FIG. 4 shows an example of the multispectral camera 10 using a rotary filter 2.

Figure 7A:
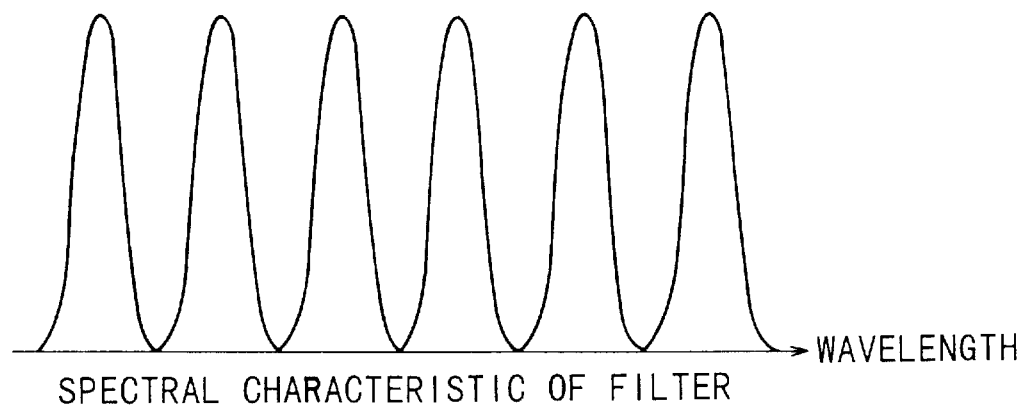
FIG. 7A is a graph showing the "spectral characteristics" a of filer.

The rotary filter 2 like the one shown in FIG. 4 is a filter portion with a plurality of filters each having spectral characteristics as represented by a curve in the graph of FIG. 7A.

Figure 7B:
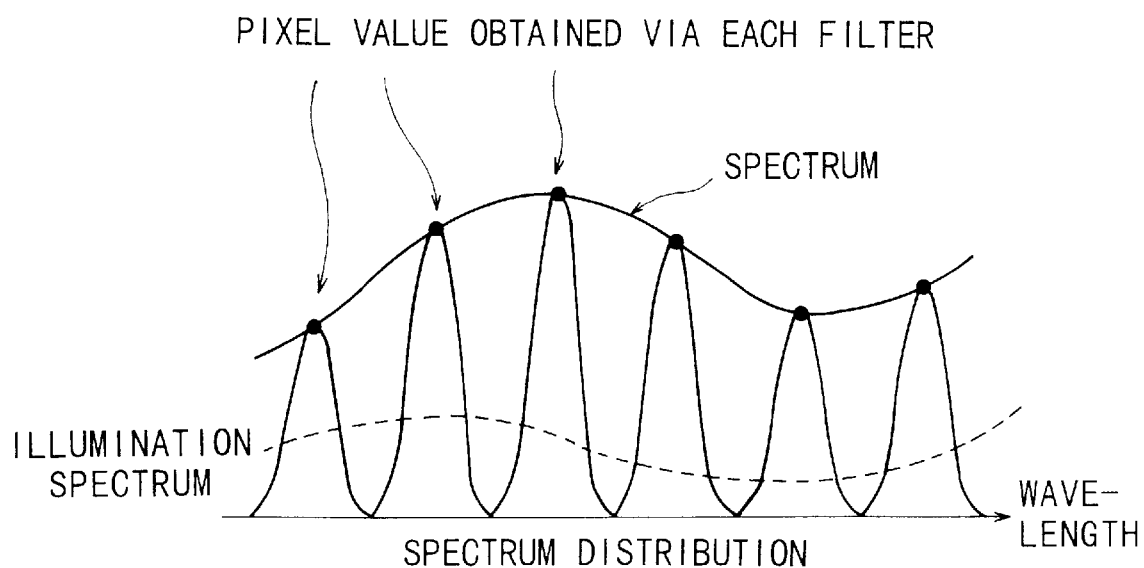
FIG. 7B is a graph showing the "spectrum distribution" obtained via the filter.

When the object is photographed by the multispectral camera 10 via an optical system 1 while rotating the rotary filter 2 by a motor 8, a spectrum distribution as represented by a curve in the graph of FIG. 7B can be obtained via a charge-coupled device (CCD) 3, an analog-to-digital (A/D) converter 4, a frame memory 5, and an interface 9.

A controller 7 controls the frame memory 5, a CCD driver 6, the motor 8, and the like.

FIG. 5 is a block diagram showing the arrangement of the illumination spectrum detector 20 or 70 shown in FIG. 3.

Such an illumination spectrum detector is basically an element which can be omitted on the photographing side by using the multispectral camera. However, the reproduction side requires any detector which detects the illumination light spectrum on only the reproduction side.

On the reproduction side, therefore, an illumination spectrum detector having a function only for the purpose of more easily detecting the illumination light spectrum may be used in place of a complicated device such as a multispectral camera.

As shown in FIG. 5, a transmission type white diffusion plate 21 as the reference object described above covers the front surfaces of a plurality of spectral filters 22 to give a uniform white light amount to the plurality of spectral filters 22.

A plurality of photodiodes 23 are aligned behind the plurality of spectral filters 22.

These photodiodes 23 are only normal photodiodes because an image need not be picked up. However, the plurality of spectral filters 22 having spectral characteristics different from each other need be arranged before these photodiodes 23.

The respective photodiodes 23 are connected to a signal switch 28.

Signals corresponding to the characteristics of the respective spectral filters 22 are output by sequentially switching the spectral filters 22 by the signal switch 28.

The signals obtained by the respective spectral filters 22 are finally digitized by an analog-to-digital (A/D) converter 29 connected to the signal switch 28 and sent to the processing device (30; not shown).

FIG. 6A is a block diagram showing the detailed arrangement of the processing device 30 on the photographing side.

More specifically, the multispectral camera 10 and the illumination spectrum detector 20 are externally connected to the processing device 30, as shown in FIG. 6A.

The communication interface device 40 is arranged outside the processing section 30 and connected to the reproduction-side device (not shown).

An image photographed by the multispectral camera 10 is the reflected light of the object obtained upon passing through the above-described rotary filter 2 once, and generated as an image signal by the CCD 3 shown in FIG. 4. Then, the image signal is transferred to the processing device 30 via the interface 9.

In the processing device 30, all the image data photographed using the respective filters of the rotary filter 2 are input to and temporarily stored in a spectral image frame memory 31, and then transferred to a subsequent interpolating unit 32.

The reason why the interpolating unit 32 is required will be explained with reference to FIG. 7B.

More specifically, normally, it is preferable in terms of the processing speed in the processing device 30 that the number of filters of the rotary filter 2 be as small as possible.

When the number of filters is decreased in consideration of the processing speed, processing of interpolating, e.g., middle point values between sampling points in a spectrum distribution like the one shown in FIG. 7B, i.e., interpolation processing for increasing the "number of dimensions" is required to obtain a predetermined spectral characteristic. For this reason, the interpolating unit 32 is required.

After the image data having undergone the interpolation processing by the interpolating unit 32 is input to and the temporarily stored in the spectrum memory 33, it is supplied to an arithmetic unit 35.

Note that the interpolating unit 32 can be eliminated by using a rotary filter having a sufficient number of filters.

Spectrum information about the spectrum of the light source used in photographing is transferred by the illumination spectrum sensor 20 to a photographing spectrum memory 34, and temporarily stored therein. Then, the spectrum information is supplied to the arithmetic unit 35.

As described above, the processing device 30 receives a spectrum like the one indicated by a solid line in FIG. 7B from the multispectral camera 10, and an illumination spectrum indicated by a broken line in FIG. 7B from the illumination spectrum sensor 20.

The illumination spectrum is input in the form of a curve like the one indicated by the broken line in FIG. 7B.

The reflection spectrum is therefore obtained by dividing the value, at each filter position, of the spectrum photographed as the entire image by the multispectral camera 10, or an interpolated value by this illumination spectrum value.

The method will be explained in detail using the following equation.

First, the element of a color specification vector [$P_1$, $P_2$, $P_3$] of each transmitted pixel is expressed by $$P_i = \int_a^b P(\lambda)S(\lambda)E(\lambda)D\lambda, \tag{1}$$

(for $i$ = 1, 2, 3) . . .

where $L(\lambda)$: illumination spectrum distribution on photographing side $E(\lambda)$: illumination spectrum distribution on reproduction side $S(\lambda)$: spectral reflectance of object to be photographed $P(\lambda)$: color matching function $S(\lambda)L(\lambda)$: spectrum distribution obtained by photographing $S(\lambda)E(\lambda)$: spectrum distribution obtained by photographing with reproduction-side illumination Conversion of the color specification vector into a device color value is expressed by the following equation:

$$\begin{bmatrix} R \\ G \\ B \end{bmatrix} = \begin{bmatrix} a & b & c \\ d & e & f \\ g & h & i \end{bmatrix} \begin{bmatrix} p1 \\ p2 \\ p3 \end{bmatrix} \tag{2}$$

for a to i are determined by the characteristics of a display device.

The device color value input at this time is corrected on the reproducing device side in accordance with the γ characteristic of the reproducing device.

When correction with γ is not performed in the reproducing device, the device color value to be input is determined by preparing in advance a table of input device color values and output device color values.

Note that the respective components in the above equation are simply referred to as follows for the sake of simplicity.

That is, $L(\lambda)$ is simply referred to as L, which represents the component of the illumination spectrum distribution on the photographing side.

$E(\lambda)$ is simply referred to as E, which represents the component of the illumination spectrum distribution on the reproduction side.

$S(\lambda)$ is simply referred to as S, which represents the spectral reflectance of the object.

$P(\lambda)$ is simply referred to as P, which represents the color matching function.

Normally, the spectrum distribution obtained by the multispectral camera is expressed by following relation: photographing illumination spectrum distribution (L)×spectral reflectance (S) of object.

In this manner, since the obtained spectrum distribution is expressed by L·S, the spectral reflectance S of the object can be obtained by dividing L·S by L.

Upon calculation of the spectral reflectance S, information E of the illumination spectrum distribution on the reproduction side is sent to the photographing side, and the spectral reflectance S is multiplied by the value E. As a result, information S·E of the spectrum distribution of the object as if the object were photographed with the illumination-side spectrum can be obtained.

Figure 13:
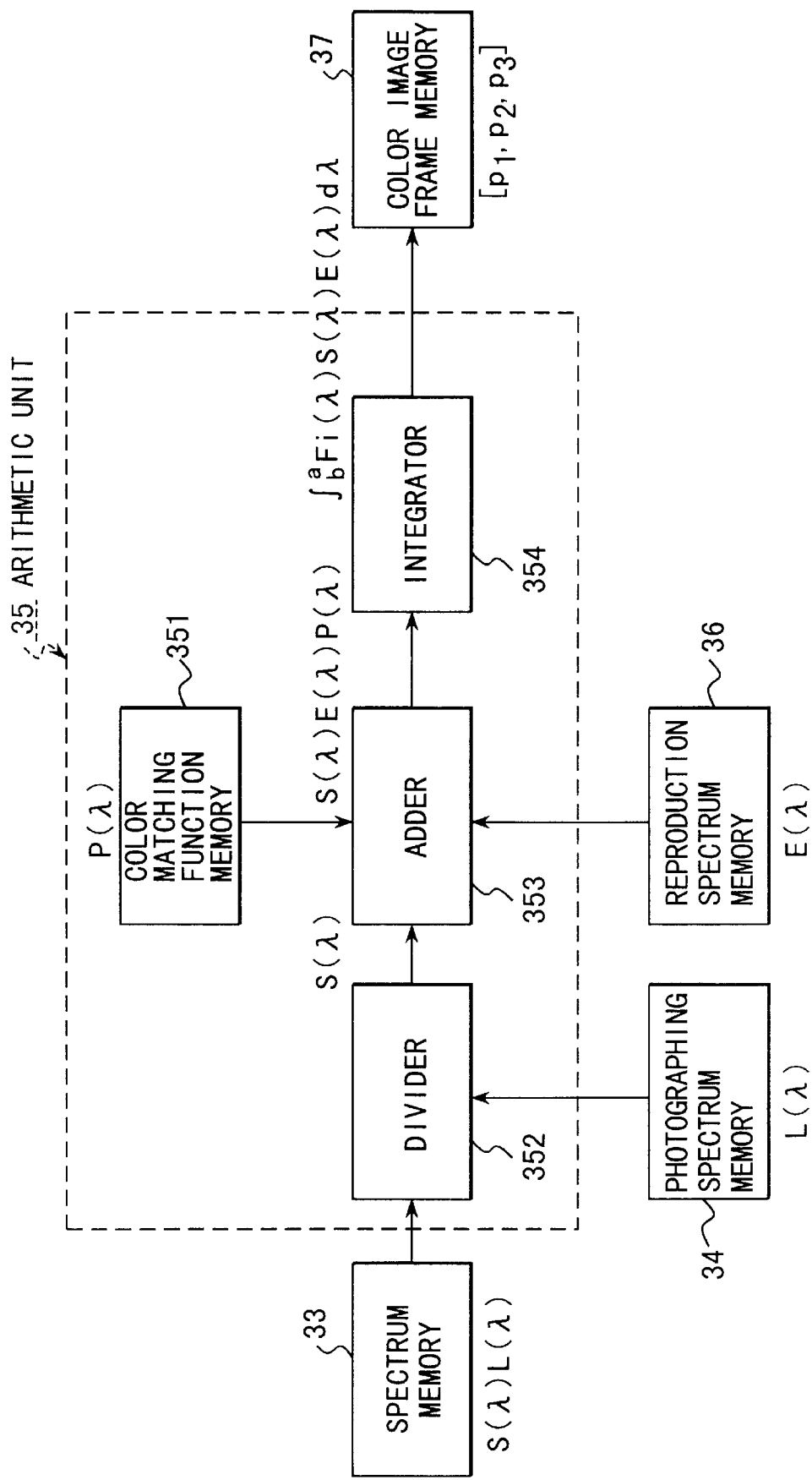
FIG. 13 is a block diagram showing an example of the arrangement of an arithmetic unit 35 of a photographing-side processing device 30 shown in FIG. 6A.

The series of processes are performed in the arithmetic unit 35 as a component of the processing device 30. The flow of the processing data S, L, E, and P is shown in FIG. 13 (to be described later).

Thereafter, information to be transmitted to the reproduction side is transmitted in the form of three vectors. A function used to change the information into a vector is a "color matching function".

As an example of the "color matching function", there is a color matching function for the XYZ colorimetric system (i.e., a three-dimensional space), like the one shown in FIG. 8.

More specifically, the color specification vector of each pixel transmitted to the reproduction side can be calculated by equation (1) using such a color matching function.

FIG. 8 shows, as an example of color matching functions for the above-described XYZ colorimetric system, three types of color matching functions, i.e., $x(\lambda)$ having two peaks around wavelengths of 440 nm and 600 nm, $y(\lambda)$ having a peak around a wavelength of 550 nm, and $z(\lambda)$ having a peak around a wavelength of 450 nm.

If the spectrum distribution information S·E of the object is multiplied by these color matching functions, and the resultant values are integrated within the range of visible light that man can see, light components present for the three vector values of the XYZ colorimetric systems are obtained.

This method is a method for reflecting the human visual properties, and more particularly, a method based on a principle of multiplying the functions of three values by each other, integrating them, and converting spectrum information into three vectors on the basis of the fact that man has visual cells which perceive the three colors of the XYZ colorimetric system.

Upon this conversion, the photographing side reproduces and outputs the image to be transmitted to the partner device on the reproduction side.

The processing operation of the photographing side (transmission side) has been described above.

Note that FIG. 13 shows a more detailed arrangement of the photographing-side arithmetic unit 35 shown in FIG. 6A.

As shown in FIG. 13, the arithmetic unit 35 is constituted by a divider 352 for receiving S·L and L respectively from the spectrum memory 33 and the photographing spectrum memory 34, and dividing them, a color matching function memory 351 holding a predetermined color matching function, an adder 353 for receiving E from a reproduction spectrum memory 36 and adding it, and an integrator 354 for integrating the addition result.

The reproduction spectrum memory 36 is a temporary storage means for holding reproduction-side illumination spectrum information E sent from the reproduction side.

A color image frame memory 37 is a temporary storage means for temporarily holding image data represented by a color specification vector upon the above-mentioned integration.

Note that the illumination spectrum represented by L or E in the above-mentioned equation is not used for removal of illumination nonuniformity or the like but is purely the spectrum of the illumination. For the processing, the illumination spectra are stored in corresponding memories.

As added in the block diagram of FIG. 6A showing the photographing side, for example, the photographing spectrum memory 34 stores the illumination spectrum L.

The spectrum memory 33 stores S·L.

The reproduction spectrum memory 36 stores E as the spectrum distribution data on the reproduction side.

In the processing device 30 on the photographing side, the arithmetic unit 35 divides the value of the spectrum memory holding S·L by the value L stored in the photographing spectrum memory 34, multiplies this quotient by the value E in the reproduction spectrum memory 36, further multiplies the obtained product by a color specification function P of the colorimetric system, and integrates the resultant value.

The element of the color specification vector of each pixel as the obtained result is stored in the color image frame memory 37 and transmitted to the partner device via the communication interface device 40.

The processing operation of the processing device 30 on the photographing side has been described above.

Next, processing performed in the reproduction-side processing device 60 shown in FIG. 6B will be explained.

More specifically, since this reproduction side mainly performs color conversion, it uses only predetermined software of a system such as the CMS, as described above.

In this case, three-dimensional vectors are values represented by the XYZ colorimetric systems. These vectors are respectively multiplied by any matrix, e.g., predetermined coefficients, and added.

In this manner, the three-dimensional vectors are converted into values which can be displayed on a device of an RGB system.

A matrix of a, b, c, d, e, f, g, h, and i in equation (2) is calculated in advance on the basis of a correspondence relationship expressed by the color specification value and device value of a single color using a color table or the like.

By this processing, the color can be output to and displayed on the display 90 by the values expressed by a certain display system, as described above.

On the reproduction side shown in FIG. 6B, information sent from the photographing side via the communication interface device 45 is input to an arithmetic unit 61 of a processing device 60.

A color conversion table 38 is a memory provided to hold in advance the above-mentioned matrix of a, b, c, d, e, f, g, h, and i for color conversion.

The reproduction-side illumination spectrum data obtained by the illumination spectrum sensor 70 is transmitted to the photographing side via the communication interface device 45.

Image information processed by the arithmetic unit 61 is output to and displayed on the external display 90 via a D/A converter 69 for converting digital data into analog data.

When the image information is to be output for printing to a printer or the like, there are four output values, i.e., Y, C, M, and K (Yellow, Cyan, Magenta, and blacK) values. In this case, a conversion matrix of 4×3 is used in place of the matrix of 3×3.

(Modification)

In the first embodiment as described above, the multispectral camera shown in FIG. 4 uses a field sequential filter having a plurality of different spectrum distribution characteristics, such as the rotary filter 2. Instead of this, the multispectral camera may use, as a modification of FIG. 4, a transmission wavelength variable filter 2A constituted by a well-known liquid crystal, like the one shown in FIG. 14, or an image pickup device using a mosaic filter having a plurality of types of wavelength selection filters 2C having different spectral characteristics, like the one shown in FIG. 15.

(Function and Advantage 1)

According to the color image recording and reproducing system of the first embodiment, the following function and advantage can be obtained.

More specifically, according to this system, since the spectrum data of a photographed image is converted and reproduced on the basis of the spectrum distribution of illumination light at the reproduction point (i.e., reproduction environment light spectrum data), the image photographed at a place different from the reproduction place can be displayed by accurate color reproduction or faithfully reproduced by printing.

According to this system, since the image obtained as multidimensional multispectrum data is converted into three-dimensional color specification vectors and then transmitted, the image can be reproduced with good color reproducibility at a place different from the photographing place without increasing the data amount, compared to a conventional color image.

(Second Embodiment)

Next, a color image recording and reproducing system according to the second embodiment of the present invention will be described.

The above-described first embodiment is related to a one-way system such as "medical diagnosis" in which the positions of the "photographing side" and the "reproducing side" are fixed for practical use. However, this embodiment is related to a "two-way" system in which the "photographing side" and the "reproduction side" are equal.

Figure 9:
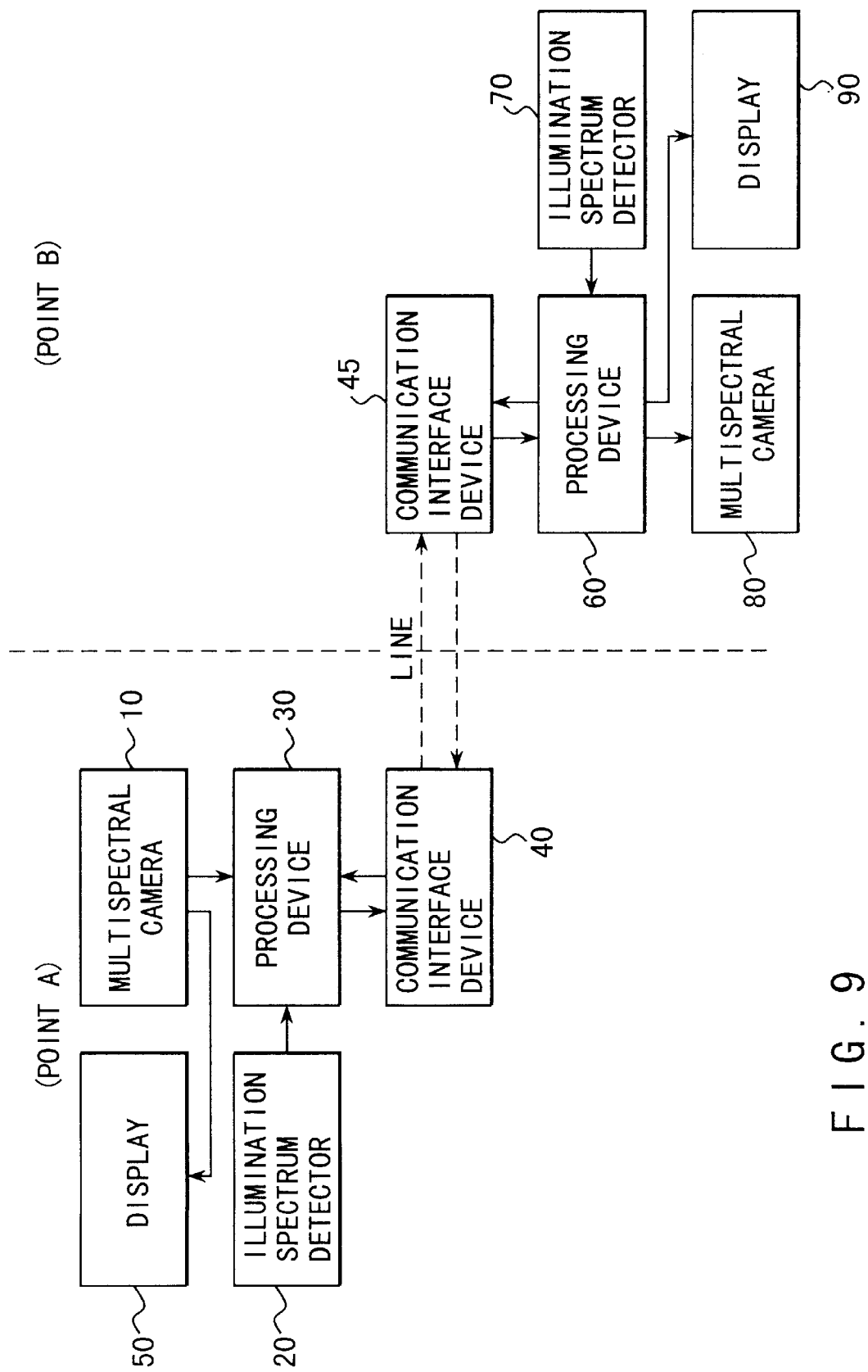
FIG. 9 is a block diagram of the system showing a "two-way" system arrangement as the second embodiment according to the present invention.

For this reason, the devices themselves are not discriminated as the "photographing side" and the "reproduction side", and are suitable for practical use for two-way communication between different points such as points A and B, like the ones shown in FIG. 9.

Basically, the system of the second embodiment has the same functional elements as those in the system of the above-described first embodiment. A detailed description will be omitted, and the characteristic feature of this embodiment will be explained below.

FIG. 9 is a block diagram showing the basic arrangement of the "two-way" color image recording and reproducing system as the second embodiment of the present invention.

In the system according to this embodiment which provides equal practical use in the "two-way" manner without discriminating the photographing side from the reproduction side, sets of photographing multispectral cameras 10 and 80, displays 50 and 90 for display, illumination spectrum detectors 20 and 70 for detecting illumination spectra, communication interfaces 40 and 45 for communication, and processing devices 30 and 60 for performing predetermined processing are respectively arranged at, e.g., points A and B. The respective sets are arranged in at least two separate points, such as points A and B in this embodiment, and constitute one system as a whole.

Further, as shown in FIG. 10, the arrangement of the processing device 30 (60) in this embodiment is basically a combination of the constituent elements of the above-described photographing-side processing device 30 shown in FIG. 6A, and the reproduction-side processing device 60.

Only the processing device 30 at point A will be described. Data of an image photographed by the multispectral camera 10 is stored once in a spectral image frame memory 31, and then stored in a spectrum memory 33 upon an increase in number of dimensions via an interpolating unit 32.

The spectrum memory 33 stores information S·L, as described above.

On the other hand, the spectrum information of illumination light obtained by the illumination spectrum sensor 20 is stored in a photographing spectrum memory 34.

The spectrum memory 34 stores information L.

Illumination spectrum information on the partner side sent via the communication interface 40 is stored in a so-called reproduction spectrum memory 36.

Since the spectrum memory 33 stores the information S·L, an arithmetic unit 35 divides the information S·L by L in the above-described manner to obtain the spectral reflectance S of the object, and multiplies information S by information E.

At this time, S is multiplied by E in the reproduction spectrum memory 36.

Further, the value E·S is multiplied by a color matching function P for color reproduction, and integrated, thereby generating desired color image data.

Thereafter, the color image generated in this manner is transmitted to the device on the partner side (point B) via the communication interface 40.

On the other hand, the color recording and reproducing device at point B having the same arrangement receives the transmitted data via the communication interface 45.

The received image information is expressed by, e.g., the XYZ colorimetric system with reference to a color conversion table 38, and so converted as to perform color reproduction suitable for the display 90 of an RGB system.

The converted image information is multiplied by a predetermined matrix and converted into analog information via a D/A converter 39. The resultant image information is output to and displayed on the display 90.

(Function and Advantage 2)

According to the color image recording and reproducing system of the second embodiment, the following function and advantage can be obtained.

More specifically, according to this system, since data at a point side where the image of an object is photographed, and data at a point side where the object image is reproduced are mutually transmitted, information can be basically transmitted between the photographing and reproduction points in the two-way manner, and the color can always be accurately reproduced on the reproduction side.

In addition, in the arrangement of this embodiment, the positions of the photographing and reproduction sides can be alternately exchanged with each other.

In the arrangement of this system, the photographing point side is equipped with at least the spectral image photographing means and the photographing light spectrum detecting means, whereas the reproduction point side is equipped with at least the reproduction environment light spectrum detecting means and the color image reproducing means. Remaining means have optimal arrangements in correspondence with the situations of the respective positions, as needed.

(Third Embodiment)

Next, a color image recording and reproducing system as the third embodiment according to the present invention will be described.

Figure 11:
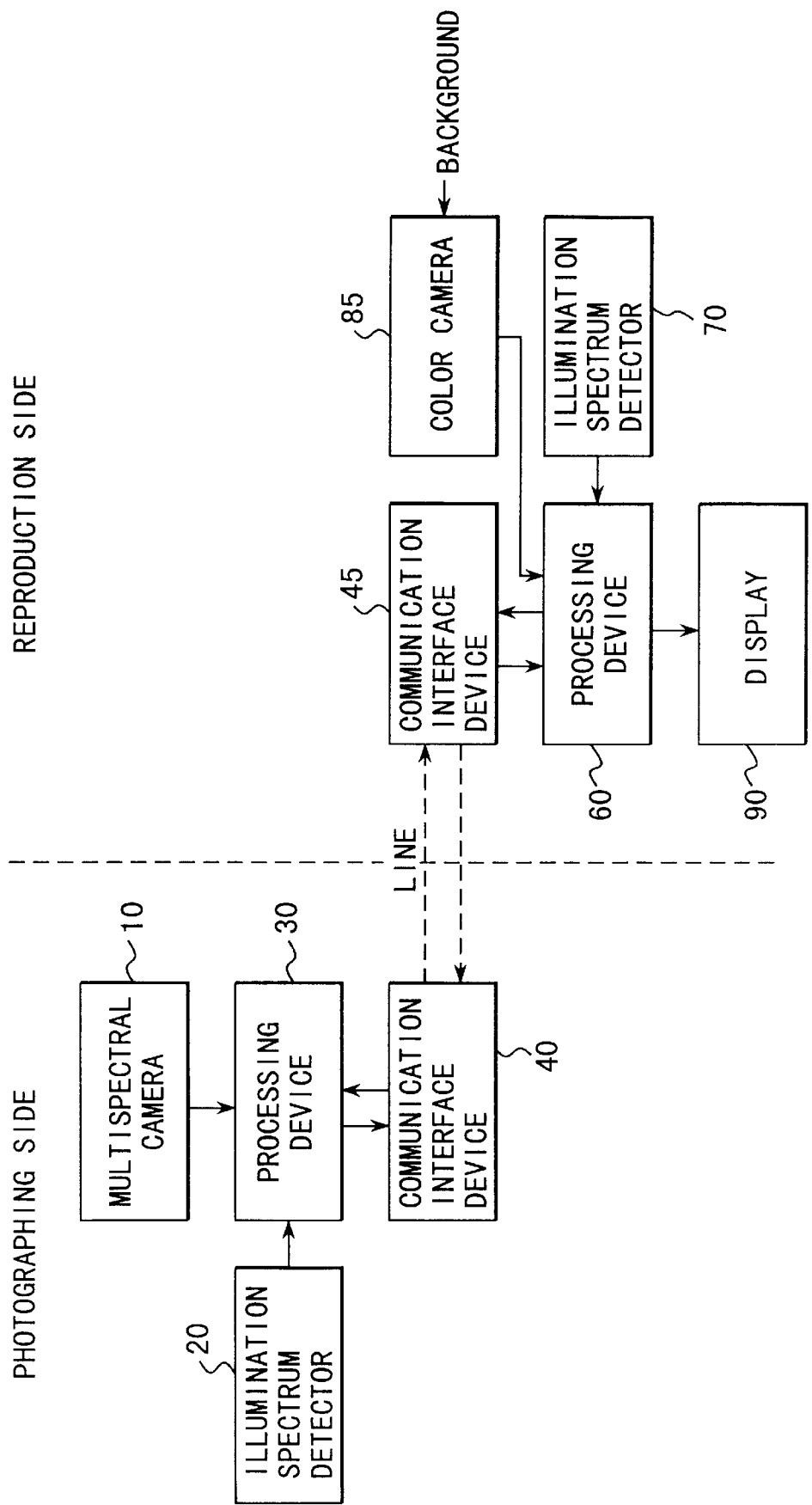
FIG. 11 is a block diagram of a system showing the arrangement of a color image recording and reproducing system as the third embodiment according to the present invention.

FIG. 11 shows the arrangement of the color image recording and reproducing system as the third embodiment of the present invention.

As shown in FIG. 11, the system of the third embodiment is basically the same as that in the first embodiment described above.

The system as the above-described first embodiment is an example characterized by a function of basically adjusting only colors. However, when this system is actually used for medical treatment, the environment of the reproduction side, i.e., the external environment of a display 90 must be taken into consideration in terms of the human sense of vision. Information about the environment is very important to an improvement in color reproducibility.

The environment includes various factors. In short, the color reproducibility can be considered to be improved when an object is identically observed on both the photographing and reproduction sides.

In this embodiment, only a true object is extracted from an image photographed on the photographing side, a background image on the reproduction side is synthesized on the image of only the object, and the synthesized image is output. For example, in the medical field, the image of only a patient is extracted as an object on the photographing side. On the reproduction side, a background image on the side of a doctor who observes the patient image is synthesized, and the resultant image is output.

The reproduction side therefore requires at least one color camera 85 for photographing the above-mentioned background as a constituent element to be added to the arrangement of the system according to the above-described first embodiment.

The arrangement of the third embodiment is different in this point from that of the above-described first embodiment.

A processing device 60 in the third embodiment requires a synthesizing means (not shown; synthesizing unit 65 to be described later), as a matter of course.

Figure 12:
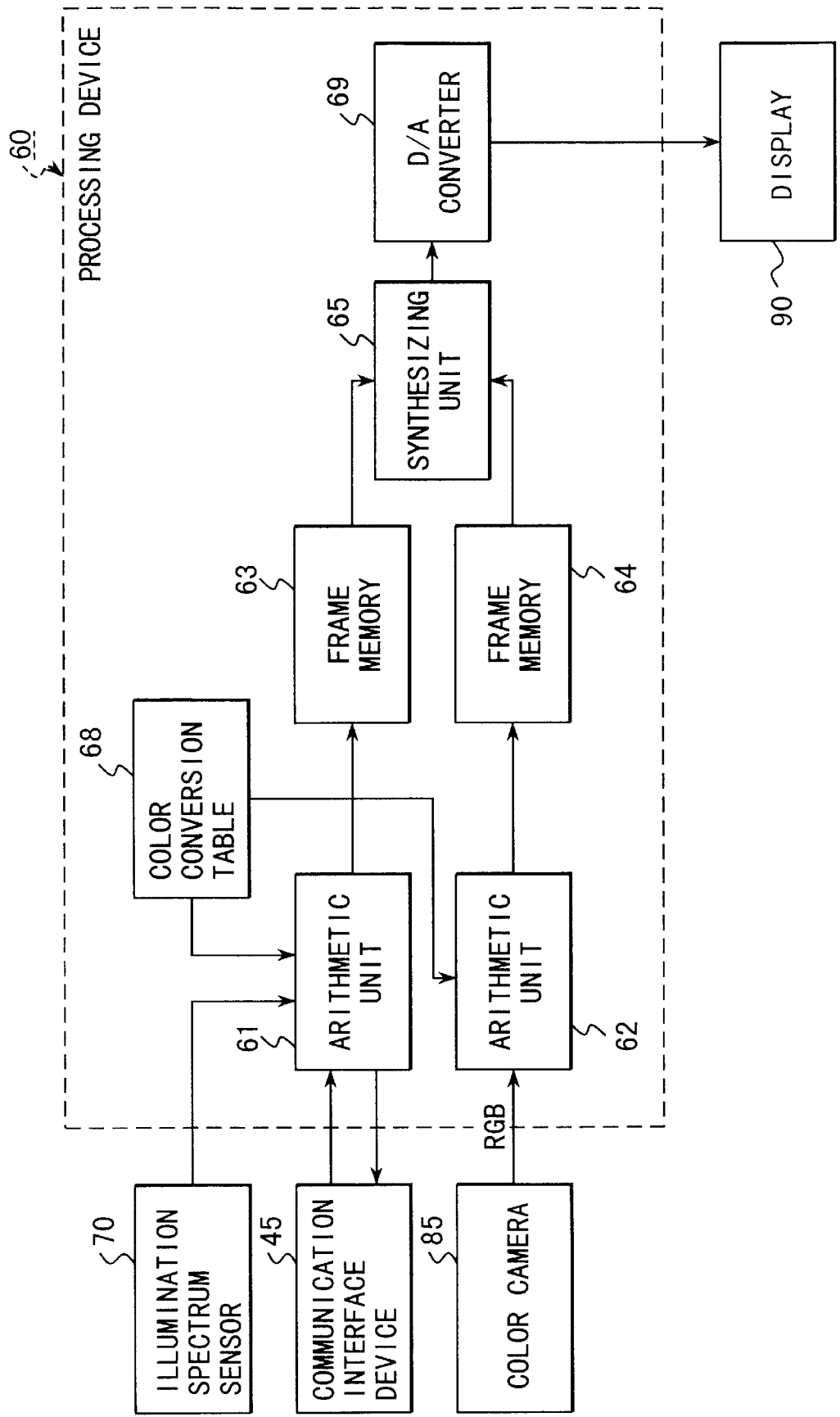
FIG. 12 is a block diagram showing the detailed arrangement of a reproduction-side processing device 60 shown in FIG. 6A.

FIG. 12 shows the detailed arrangement of the reproduction-side processing device 60 shown in FIG. 11.

The processing device 60 is basically similar to that in the first embodiment. Image data sent via a communication interface 45 is input to an arithmetic unit 61.

In this embodiment, the image data is converted by the arithmetic unit 61 into device color values for display. The image data converted into the device values is stored in a frame memory 63.

Colors photographed by the color camera 85 are colors of the RGB system. These colors are not always equivalent to colors displayed on a display device, i.e., a display 90. Therefore, predetermined correction processing must be performed.

A background image, for the display 90, photographed by the color camera 85 is converted by an arithmetic unit 62 into the device values of the display 90 and stored in a frame memory 64.

A color conversion table 68 is a table storing both information about matrix coefficients for converting the above-described color specification vectors into display device values and information about coefficients for converting the R, G, and B values of a color image photographed by the color camera 85 into display device values.

After two pieces of image information output from the two frame memories 63 and 64 are synthesized by the synthesizing unit 65, the synthesized information undergoes conversion optimum for the display device (i.e., the display 90) by a D/A converter 69. The converted information is sent to the display 90, and output and displayed.

There are various well-known methods of extracting an object to be photographed.

For example, according to a certain method, the background image of a photographing target is photographed in advance. A difference between this image and an object is calculated. A changed portion is extracted as the object.

Further, according to another method, in the case of a moving object such as man, a changed portion is extracted as the object on the basis of a difference between two images photographed at different times.

The object extracted using such a well-known method is stored in the frame memory 63.

The synthesizing unit 65 synthesizes the image data of the object portion read out from the frame memory 63, and the image data of a portion, except for the object, read out from the frame memory 64, into one image.

The synthesized image obtained in this manner is converted into analog data by the D/A converter 69 and displayed on the display 90.

(Modification)

In the above-mentioned embodiment, the object image and the background image of the reproduction environment are converted into the device values of the reproducing device, and synthesized. The synthesis processing of these images may use any coordinate system as far as these images are expressed by the same color specification coordinate system.

More specifically, the background image photographed by the color camera 85 may be converted into the coordinate system (XYZ colorimetric system in the first embodiment) of the color specification vector of the object, and synthesized. The image as the synthesis result may be converted into the device values of the display 90 and displayed.

In addition, the object image may be converted into the color specification coordinate system of the color camera 85, and synthesized with the background. The synthesized image may be converted into the device values of the display 90 and displayed.

As another modification, the background image of the reproduction environment may be photographed using a multispectral camera.

This case is particularly effective for the two-way system described in the second embodiment because a special device need not be added.

(Function and Advantage 3)

According to the color image recording and reproducing system of the third embodiment, the following function and advantage can be obtained.

More specifically, this system further comprises the display background photographing means for photographing the color image of the background of the display device, and the image synthesizing means for converting color specification vector data and the background color image into an image of a single colorimetric system, and synthesizing the converted background color image and an object image. By reproducing the synthesized image by the color image reproducing means, the background color image of the reproducing device on the reproduction point side, and the object are converted into images under the same illumination conditions. These images are synthesized, and the synthesized image is reproduced and output. Therefore, colors faithful to the colors of the object are reproduced visually more accurately on the reproduction side.

For example, if this system is used for remote medical treatment or the like, a patient as an object at a remote place is displayed as if the patient were present in front of the doctor on the reproduction side. A morbid portion of the patient can be observed with an original accurate color.

By using this system for remote medical treatment or the like, therefore, a remote medical system capable of performing a proper diagnosis, or the like can be realized.

(Other Modifications)

In addition to the plurality of embodiments and modifications, various modifications can be made within the range without departing from the gist of the present invention.

The present invention has been described on the basis of the first to third embodiments. The present specification includes the following inventions.

(1) A color image recording and reproducing system for reproducing, at a different remote place, an image recorded at an arbitrary place is characterized by comprising a spectral image photographing means for photographing an object to be photographed as spectrum data in units of pixels, a photographing light spectrum detecting means for detecting the spectrum distribution (to be referred to as photographing light spectrum data hereinafter) of illumination light at a point where the object is photographed, a reproduction environment light spectrum detecting means for detecting the spectrum distribution (to be referred to as reproduction environment light spectrum data hereinafter) of illumination light of a point where the image of the object is reproduced, an image converting section for converting, on the basis of the photographing light spectrum data and the reproduction environment light spectrum data, the spectrum data into a color image obtained when the object is photographed under illumination light identical to that on the reproduction point side, and a color image reproducing means for reproducing the color image data.

(1') A color image recording and reproducing system for reproducing, at a different place (e.g., remote place), an image recorded at an arbitrary place is characterized by comprising a spectral image photographing means for photographing an object to be photographed as spectrum data in units of pixels, a photographing light spectrum detecting means for detecting the spectrum distribution (to be referred to as photographing light spectrum data hereinafter) of illumination light at a point where the object is photographed, a spectral reflectance distribution calculating means for eliminating the influence of the photographing light spectrum data from the spectrum data photographed by the spectral image photographing means, and calculating the spectral reflectance distribution of the object, a reproduction environment light spectrum detecting means for detecting the spectrum distribution (to be referred to as reproduction environment light spectrum data hereinafter) of illumination light of a point where the image of the object is reproduced, a spectrum converting means for calculating, on the basis of the spectral reflectance distribution and the reproduction environment light spectrum data, a spectrum distribution obtained when the object is photographed under illumination light identical to that on the reproduction point side, a vector imaging means for converting a spectrum distribution corresponding to each of the pixels calculated by the spectrum converting means into three-dimensional color specification vector data, and a color image reproducing means for reproducing a color image on the basis of the color specification vector data.

(Function and Advantage 1)

According to the system defined in (1) and (1'), a photographed image is reproduced upon converting the spectrum data of the photographed image on the basis of the spectrum distribution (i.e., reproduction environment light spectrum data) of illumination light at the reproduction point. Therefore, an image photographed at a place (e.g., a remote place) different from the reproduction place can be reproduced (displayed or printed) by accurate color reproduction.

(2) A color image recording and reproducing system defined in (1') is characterized in that the color image reproducing means comprises a color converting means for converting the color specification vector data into the device color value of a reproducing device on the reproduction point side.

(Function and Advantage 2)

According to the system defined in (2), the color is converted into proper data, such as R, G, and B, or Y, C, M, and K, in accordance with the characteristics of the reproducing device on the reproduction point side. Therefore, an image photographed at a place (e.g., a remote place) different from the reproduction place can be reproduced (displayed or printed) by accurate color reproduction regardless of the types of reproducing devices.

(3) A color image recording and reproducing system defined in (1') is characterized by further comprising a transmitting means for mutually transmitting data on a point side where the image of the object is photographed, and data on a point side where the image of the object is reproduced.

(Function and Advantage 3)

According to the system defined in (3), the data on the point side where the object image is photographed, and data on the point side where the object image is reproduced are mutually transmitted. At least the spectral image photographing means and the photographing light spectrum detecting means are arranged on the photographing point side. At least the reproduction environment light spectrum detecting means and the color image reproducing means are arranged on the reproduction point side. Remaining means are arranged in accordance with various situations on the photographing and reproduction point sides. Therefore, an optimum system arrangement can be constructed.

(4) A color image recording and reproducing system defined in (1') to (3) is characterized in that the color image reproducing means comprises a means for photographing the background image of a reproduction environment, and a color image synthesizing means for synthesizing the color specification vector data of the object and the reproduction environment.

(Function and Advantage 4)

According to the system defined in (4), a visually accurate color expression can be realized by synthesizing the background image of the display device on the reproduction side with the object image converted as if it were photographed under the illumination on the reproduction side, and displaying the synthesized image.

(5) A color image recording and reproducing system defined in (1') is characterized in that the spectral image photographing means is a multispectral camera using a field sequential filter having a plurality of different spectrum distribution characteristics or a transmission wavelength variable filter.

(Function and Advantage 5)

According to the system defined in (5), the spectrum data of the object image can be obtained with a high precision in units of pixels by using a plurality of field sequential filters or a transmission wavelength variable filter consisting of, e.g., a liquid crystal.

(6) A color image recording and reproducing system defined in (1') is characterized in that the spectral image photographing means is a multispectral camera using an image pickup device using a mosaic filter having a plurality of types of filters with different spectral characteristics.

(Function and Advantage 6)

According to the system defined in (6), the spectrum data of the object image can be obtained by one photographing operation or photographing operations whose number of times is smaller than the number of types of spectral characteristics of a filter to be used. Therefore, a high-speed system can be constructed, and the image pickup device can be downsized.

(7) A color image recording and reproducing system defined in (1') is characterized in that the vector imaging means calculates, using the color matching function distribution of three stimulus values of a predetermined colorimetric system stored in a storage means in advance, the spectrum distribution obtained when the image obtained by the spectrum converting means is photographed in units of pixels under illumination light identical to that on the reproduction side.

(Function and Advantage 7)

According to the system defined in (7), an accurate color expression can be performed independently of the characteristics of the spectral image photographing means by using the color matching function distribution (e.g., X, Y, and Z, or L*a*b*) of three stimulus values of a predetermined colorimetric system.

(8) A color image recording and reproducing system defined in (1') is characterized in that the photographing light spectrum detecting means detects the photographing light spectrum by photographing a reference target having a predetermined spectral reflectance distribution using the spectral image photographing means.

(Function and Advantage 8)

According to the system defined in (8), the arrangement of the apparatus can be simplified by using the spectral image photographing means as a photographing light spectrum detecting means.

(9) Color image recording and reproducing systems for mutually recording and reproducing images between first and second different points are characterized in that each color image recording and reproducing system is constituted by a spectral image photographing means for photographing an object to be photographed as spectrum data in units of pixels, a photographing light spectrum detecting means for detecting the spectrum distribution (to be referred to as photographing light spectrum data hereinafter) of illumination light at a point where the object is photographed, a spectral reflectance distribution calculating means for eliminating the influence of the photographing light spectrum data from the spectrum data photographed by the spectral image photographing means, and calculating the spectral reflectance distribution of the object, a reproduction environment light spectrum detecting means for detecting the spectrum distribution (to be referred to as reproduction environment light spectrum data hereinafter) of illumination light of a point where the object is reproduced, a spectrum converting means for calculating, on the basis of the spectral reflectance distribution and the reproduction environment light spectrum data, a spectrum distribution obtained when the object is photographed under illumination light identical to that on the reproduction point side, and a vector imaging means for converting a spectrum distribution corresponding to each pixel calculated by the spectrum converting means into three-dimensional color specification vector data, wherein the color image recording and reproducing systems are respectively arranged at the first and second points, and the color image recording and reproducing systems further comprise transmitting means for mutually transmitting the reproduction environment light spectrum data and the color specification vector data between the first point and the second point.

(Function and Advantage 9)

According to the system defined in (9), images photographed at two different points can be transmitted in a two-way manner by accurate color reproduction.

(10) Color image recording and reproducing systems defined in (9) are characterized in that the color image reproducing means comprises a color converting means for converting the color specification vector data into the device color values of a reproducing device on the reproduction point side.

(Function and Advantage 10)

According to the system defined in (10), the colors are converted into proper data, such as R, G, and B, or Y, C, M, and K, in accordance with the characteristics of the reproducing device on the reproduction point side. Therefore, an image photographed at a place (e.g., a remote place) different from the reproduction place can be reproduced (displayed or printed) by accurate color reproduction regardless of the types of reproducing devices. (11) Color image recording and reproducing systems defined in (1') or (9) are characterized by further comprising a display background photographing means for photographing the color image of a background of a display device, and an image synthesizing means for converting the color specification vector data and background color image data into images of a single colorimetric system, and synthesizing the converted background color image and the image of the object, so that the color image reproducing means reproduces and displays the synthesized image.

(Function and Advantage 11)

According to the system defined in (11), the color image of the background of the reproducing device on the reproduction point side, and the object image are synthesized and reproduced upon conversion into the same illumination condition. Therefore, the image can be reproduced (displayed or printed) by visually more accurate color reproduction.

(12) A color image recording and reproducing system defined in (11) is characterized in that, after converting the three-dimensional color specification vector data of the object and the background color image data into the device color values of the reproducing device, the image synthesizing means synthesizes the background color image and the object image.

(Function and Advantage 12)

According to the system defined in (12), after the object image is converted into the device color values, it is synthesized in accordance with the color image data of the background of the reproducing device on the reproduction point side. Therefore, the image can be reproduced (displayed or printed) by more accurate color reproduction.

(13) A color image recording and reproducing system defined in (11) is characterized in that, after converting the background color image into the expression of a colorimetric system on the object side, synthesizing the converted image, and converting the synthesized image into the device color values of the reproducing device, the image synthesizing means reproduces and displays the converted image.

(Function and Advantage 13)

According to the system defined in (13), after the color image data of the background of the reproducing device on the reproduction point side is converted into the data of the colorimetric system for the object image, and the converted image is synthesized, the synthesized image is converted into the device color values and reproduced. Therefore, the image can be reproduced (displayed or printed) by visually more accurate color reproduction.

(14) A color image recording and reproducing system defined in (11) is characterized in that, after converting the color specification vector data into the device color values of the display background photographing means, synthesizing the converted image, and further converting the synthesized image into the device color values of the reproducing device, the image synthesizing means reproduces and displays the image.

(Function and Advantage 14)

According to the system defined in (14), the color specification vector data of the object are converted into the device color values of the display background photographing means, and the converted data are synthesized. Therefore, the image can be reproduced (displayed or printed) by visually more accurate color reproduction.

(15) A color image recording and reproducing method of mutually recording and reproducing images between first and second two different points is characterized by comprising the spectral image photographing step of photographing an object to be photographed as spectrum data at the first point in units of pixels, the photographing light spectrum detecting step of detecting the spectrum distribution (to be referred to as photographing light spectrum data hereinafter) of illumination light at a point where the object is photographed, the spectral reflectance distribution calculating step of eliminating the influence of the photographing light spectrum data from the spectrum data photographed in the spectral image photographing step, and calculating the spectral reflectance distribution of the object, the reproduction environment light spectrum detecting step of detecting a spectrum distribution (to be referred to as reproduction environment light spectrum data hereinafter) of illumination light at the second point where an image of the object is reproduced, the reproduction environment light spectrum data transmitting step of transmitting the reproduction environment light spectrum data at the second point detected in the reproduction environment light spectrum detecting step to the first point, the spectrum converting step of calculating, on the basis of the reproduction environment light spectrum data transmitted in the reproduction environment light spectrum data transmitting step, and the data of the spectral reflectance distribution, a spectrum distribution obtained when the object is photographed under illumination light identical to that on the reproduction point side, the vector imaging step of converting a spectrum distribution of each of the pixels calculated by the spectrum converting means into three-dimensional color specification vector data, the color specification vector data transmitting step of transmitting the color specification vector data to the second point, and the color image reproducing step of reproducing (e.g., displaying or printing) a color image on the basis of the color specification vector data.

(Function and Advantage 15)

According to the system defined in (15), only the reproduction environment light spectrum data and the color specification vector data which are small in data amount are transmitted between the two points. Therefore, an image photographed at a place (e.g., a remote place) different from the reproduction place can be reproduced (displayed or printed) by accurate color reproduction without increasing the transmission capacity.

(16) A color image recording and reproducing method defined in (15) is characterized in that the color image reproducing step comprises the color converting step of converting the color specification vector data into the device color values of a reproducing device on the reproduction point side.

(Function and Advantage 16)

According to the system defined in (16), the colors are converted into proper data, such as R, G, and B, or Y, C, M, and K, in accordance with the characteristics of the reproducing device on the reproduction point side. Therefore, an image photographed at a place (e.g., a remote place) different from the reproduction place can be reproduced (displayed or printed) by accurate color reproduction regardless of the types of reproducing devices.

(17) Color image recording and reproducing systems defined in (11) are characterized in that the display background photographing means is a multispectral camera.

(Function and Advantage 17)

According to the system defined in (17), in the case of a two-way system, the image can be reproduced (displayed or printed) by visually more accurate color expression without adding a special device.

As has been described above, according to the present invention, in reproducing an image photographed at a remote place, the colors can be accurately reproduced even with a small amount of the information transmitted between the photographing and reproduction places. The transmission capacity does not increase. At a place, e.g., a remote place, different from the reproduction place, the colors of the photographed image can be accurately reproduced. The image can be reproduced and output by display, printing, or the like.

According to the present invention, the color is converted into proper data in accordance with the characteristics of the reproducing device. Therefore, there can be provided a color image recording and reproducing system constituted by an apparatus which realizes a color image recording and reproducing method capable of always faithfully reproducing and outputting the image by display or printing regardless of the types of reproducing devices.

Additional embodiments of the present invention will be apparent to those skilled in the art from consideration of the specification and practice of the presence invention disclosed herein. It is intended that the specification and examples be considered as exemplary only, with the true scope of the present invention being indicated by the following claims.

What is claimed is:

1. A color image recording and reproducing system for reproducing, at a different remote place, an image recorded at an arbitrary place, comprising:

spectral image photographing means for photographing an object to be photographed as spectrum data in units of pixels;

photographing light spectrum detecting means for detecting a photographing light spectrum data including data on a spectrum distribution of illumination light at a point where said object is photographed by said spectral image photographing means;

reproduction environment light spectrum detecting means for detecting reproduction environment light spectrum data including data on a spectrum distribution of illumination light at a reproduction point side which includes a point where an image of said object photographed by said spectral image photographing means is reproduced;

image converting means for converting, on the basis of the photographing light spectrum data detected by said photographing light spectrum detecting means and the reproduction environment light spectrum data detected by said reproduction environment light spectrum detecting means, the spectrum data photographed by said spectral image photographing means into color image data equivalent to color image data obtained when said object is photographed under illumination light substantially identical to that on the reproduction point side; and color image reproducing means for reproducing the color image data converted by said image converting means.

2. A color image recording and reproducing system according to claim 1, wherein said image converting means comprises:

spectral reflectance distribution calculating means for eliminating an influence of the photographing light spectrum data detected by said photographing light spectrum detecting means from the spectrum data photographed by said spectral image photographing means, and calculating a spectral reflectance distribution of said object;

spectrum converting means for calculating, based on the spectral reflectance distribution calculated by said spectral reflectance distribution calculating means and an output of said reproduction environment light spectrum detecting means, a spectrum distribution obtained when said object is photographed under illumination light substantially identical to that on the reproduction point side; and vector imaging means for converting a spectrum distribution corresponding to each of said pixels calculated by said spectrum converting means into three-dimensional color specification vector data; and wherein said color image reproducing means reproduces a color image of said object based on the color specification vector data produced by said vector imaging means.

3. A color image recording and reproducing system according to claim 2, wherein said color image reproducing means comprises color converting means for converting the color specification vector data into a device color value of a reproducing device on the reproduction point side.

4. A color image recording and reproducing system according to claim 2, further comprising transmitting means for mutually transmitting data on a point side where the image of said object is photographed, and data on a point side where the image of said object is reproduced.

5. A color image recording and reproducing system according to claim 2, wherein said color image reproducing means comprises:

means for photographing a background image of a reproduction environment; and color image synthesizing means for synthesizing the color specification vector data of said object and the reproduction environment light spectrum data.

6. A color image recording and reproducing system according to claim 2, wherein said spectral image photographing means includes a multispectral camera comprising one of (i) a field sequential filter having a plurality of different spectrum distribution characteristics and (ii) a transmission wavelength variable filter.

7. A color image recording and reproducing system according to claim 2, wherein said spectral image photographing means includes a multispectral camera comprising an image pickup device using a mosaic filter having a plurality of types of filters with different spectral characteristics.

8. A color image recording and reproducing system according to claim 2, wherein said vector imaging means calculates, on the basis of a color matching function distribution of three stimulus values of a predetermined colorimetric system stored in a storage means in advance, the spectrum distribution of each of said pixels obtained when the image of said object obtained by said spectrum converting means is photographed under illumination light identical to that on the reproduction point side.

9. A color image recording and reproducing system according to claim 2, wherein said photographing light spectrum detecting means detects the photographing light spectrum by photographing a reference target having a predetermined spectral reflectance distribution using said spectral image photographing means.

10. Color image recording and reproducing systems according to claim 1, wherein said image converting means further comprises:

spectral reflectance distribution calculating means for eliminating an influence of the photographing light spectrum data detected by said photographing light spectrum detecting means from the spectrum data photographed by said spectral image photographing means, and calculating a spectral reflectance distribution of said object;

spectrum converting means for calculating, on the basis of the spectral reflectance distribution calculated by said spectral reflectance distribution calculating means and an output of said reproduction environment light spectrum detecting means, a spectrum distribution obtained when said object is photographed under illumination light substantially identical to that on the reproduction point side; and vector imaging means for converting a spectrum distribution corresponding to each of said pixels calculated by said spectrum converting means into three-dimensional color specification vector data; and wherein said color image reproducing means reproduces a color image of said object on the basis of the color specification vector data produced by said vector imaging means.

11. Color image recording and reproducing systems according to claim 10, wherein said color image reproducing means comprises color converting means for converting the color specification vector data into device color values of a reproducing device on the reproduction point side.

12. Color image recording and reproducing systems according to claim 2 or 10, further comprising:

display background photographing means for photographing a color image of a background of a display device; and image synthesizing means for converting the color specification vector data produced by said vector imaging means and background color image data photographed by said display background photographing means into images of a single colorimetric system, and synthesizing the converted background color image data and image data of said object, so that said color image reproducing means reproduces and displays an image synthesized by said image synthesizing means.

13. Color image recording and reproducing systems according to claim 12, wherein, after converting the three-dimensional color specification vector data of said object and the background color image data into device color values of said reproducing device, said image synthesizing means synthesizes the background color image data and the three-dimensional color specification vector data.

14. Color image recording and reproducing systems according to claim 12, wherein, after converting the background color image data into an expression of a colorimetric system on the object side, synthesizing the converted data with the three-dimensional color specification vector data of said object, and converting the synthesized image data into device color values of said reproducing device, said image synthesizing means reproduces and displays the converted image data.

15. Color image recording and reproducing systems according to claim 12, wherein, after converting the color specification vector data into device color values of said display background photographing means, synthesizing the converted data with the background color image data, and further converting the synthesized image data into device color values of said reproducing device, said image synthesizing means reproduces and displays the image data.

16. A color image recording and reproducing method of mutually recording and reproducing images between first and second different points, according to claim 1, wherein said image converting step comprises:

a spectral reflectance distribution calculating step of eliminating an influence of the photographing light spectrum data detected in the photographing light spectrum detecting step from the spectrum data photographed in the spectral image photographing step, and calculating a spectral reflectance distribution of said object;

a spectrum converting step of calculating, on the basis of the spectral reflectance distribution calculated in the spectral reflectance distribution calculating step and a result of the reproduction environment light spectrum detecting step, a spectrum distribution obtained when said object is photographed under illumination light substantially identical to that on the second point side;

a vector imaging step of converting a spectrum distribution corresponding to each of said pixels calculated in the spectrum converting step into three-dimensional color specification vector data; and wherein the color image reproducing step reproduces a color image of said object on the basis of the color specification vector data produced in the vector imaging step.

17. A color image recording and reproducing method according to claim 16, wherein the color image reproducing step comprises a color image converting step of converting the color specification vector data into device color values of a reproducing device on the second point side.

18. Color image recording and reproducing systems according to claim 12, wherein said display background photographing means comprises a multispectral camera.

19. Color image recording and reproducing systems for mutually recording and reproducing images between first and second different points, wherein:

each color image recording and reproducing system comprises:

spectral image photographing means for photographing an object to be photographed as spectrum data in units of pixels;

photographing light spectrum detecting means for detecting photographing light spectrum data including data on a spectrum distribution of illumination light at a point where said object is photographed by said spectral image photographing means;

reproduction environment light spectrum detecting means for detecting reproduction environment light spectrum data including data on a spectrum distribution of illumination light at a reproduction point side which includes a point where an image of said object photographed by said spectral image photographing means is reproduced;

image converting means for converting, on the basis of the photographing light spectrum data detected by said photographing light spectrum detecting means and the reproduction environment light spectrum data detected by said reproduction environment light spectrum detecting means, the spectrum data photographed by said spectral image photographing means into color image data equivalent to color image data obtained when said object is photographed under illumination light substantially identical to that on the reproduction point side;

color image reproducing means for reproducing the color image data converted by said image converting means, wherein said color image recording and reproducing systems are respectively arranged at said first and second different points; and said color image recording and reproducing systems further comprise transmitting means for mutually transmitting the reproduction environment light spectrum data and the color specification vector data between the first point and the second point.

20. A color image recording and reproducing method of mutually recording and reproducing images between first and second different points, comprising:

a spectral image photographing step of photographing an object to be photographed as spectrum data at the first point in units of pixels;

a photographing light spectrum detecting step of detecting photographing light spectrum data which includes a spectrum distribution of illumination light at a point where said object is photographed;

a reproduction environment light spectrum detecting step of detecting reproduction environment light spectrum data including data on a spectrum distribution of illumination light at the second point where an image of said object is reproduced;

a reproduction environment light spectrum data transmitting step of transmitting the reproduction environment light spectrum data at the second point detected in the reproduction environment light spectrum detecting step to the first point;

an image converting step of converting, on the basis of the photographing light spectrum data detected in the photographing light spectrum detecting step and the reproduction environment light spectrum data detected in the reproduction environment light spectrum detecting step, the spectrum data photographed in said spectral image photographing step into color image data equivalent to color image data obtained when said object is photographed under illumination light substantially identical to that on the reproduction point side; and a color image reproducing step of reproducing the color image data converted in said image converting step.

* * * * *